US011750574B1

(12) United States Patent
Jain et al.

(10) Patent No.: US 11,750,574 B1
(45) Date of Patent: Sep. 5, 2023

(54) END-TO-END ENCRYPTED INTERACTIVE MESSAGING USING MESSAGE TEMPLATES

(71) Applicant: WhatsApp LLC, Menlo Park, CA (US)

(72) Inventors: Aman Jain, San Francisco, CA (US); Sanat Sourav Rath, San Francisco, CA (US); Anand Prasad, Fremont, CA (US)

(73) Assignee: WhatsApp LLC, Menlo Park, CA (US)

( * ) Notice: Subject to any disclaimer, the term of this patent is extended or adjusted under 35 U.S.C. 154(b) by 273 days.

(21) Appl. No.: 17/092,519

(22) Filed: Nov. 9, 2020

(51) Int. Cl.
| | |
|---|---|
| *H04L 29/06* | (2006.01) |
| *H04L 9/40* | (2022.01) |
| *H04W 4/14* | (2009.01) |
| *H04W 12/02* | (2009.01) |
| *H04W 12/033* | (2021.01) |

(52) U.S. Cl.
CPC ...... *H04L 63/0428* (2013.01); *H04L 63/0421* (2013.01); *H04W 4/14* (2013.01); *H04W 12/02* (2013.01); *H04W 12/033* (2021.01)

(58) Field of Classification Search
CPC .................................................. H04L 63/0428
See application file for complete search history.

(56) References Cited

U.S. PATENT DOCUMENTS

| | | | |
|---|---|---|---|
| 8,494,163 B2* | 7/2013 | Casati | H04W 12/033 |
| | | | 380/270 |
| 11,303,588 B1* | 4/2022 | Rastogi | H04L 51/02 |
| 2018/0167388 A1* | 6/2018 | Farrell | H04L 63/0428 |

FOREIGN PATENT DOCUMENTS

WO   WO-2013097326 A1 *   7/2013   ......... H04L 63/0428

* cited by examiner

*Primary Examiner* — Bradley W Holder
(74) *Attorney, Agent, or Firm* — McDermott Will & Emery LLP

(57) ABSTRACT

Exemplary embodiments relate to techniques for end-to-end encrypted interactive messaging between users of a communication system. For example, the interactive messaging may be based on a message template. An end-to-end encrypted message may be sent to a recipient. The encrypted message may contain at least a template identifier associated with the message template and one or more dynamic parameters. The receiving device may decrypt the message and hydrate the message template with the one or more dynamic parameters.

17 Claims, 17 Drawing Sheets

MESSAGE TEMPLATE 201

Header 202
- Add a Title

Message Body 204
- Hello, {{1}} – Your package has shipped to your address at {{2}}.
  Your tracking number is {{3}}.

Footer 206
- Add a footer at bottom of message

Button 208

| Action Type | Button Text | Info |
|---|---|---|
| Call Phone # | Call Us | 123-4567-8910 |
| Visit Website | Visit our Website | www.website.com |
| Visit Website | Visit our Help Center | www.helpcenter.com |

Cancel | Submit

Preview 210

*FIG. 2*

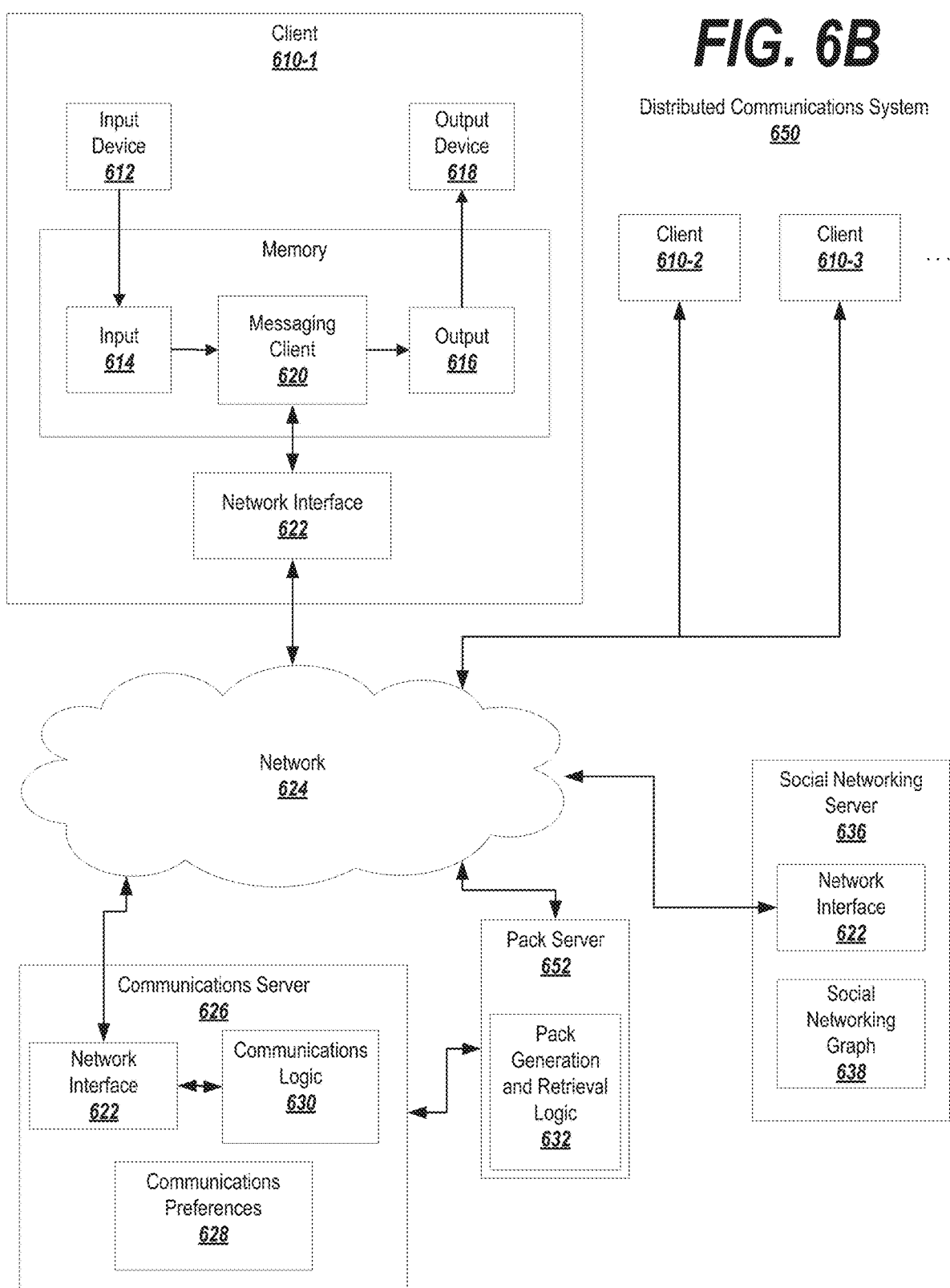

END-TO-END ENCRYPTED INTERACTIVE MESSAGING USING MESSAGE TEMPLATES

BACKGROUND

Messaging may be the act of composing and sending electronic messages, typically consisting of alphanumeric characters, between two or more users of computing devices via a messaging system. Interactive messaging may be similar to conventional messaging, except interactive messages may also contain user interactive elements, such as media content, images, videos, Graphics Interchange Formats (GIFs), interactive icons or buttons, etc. Generally, in messaging systems, messages are passed through and stored by intermediaries, from which they are retrieved by the recipient. Because these messages are typically encrypted "in transit," they can be accessible either legitimately by the messaging service providers or illegitimately by various bad actors (e.g., hackers, fraudsters), which compromises privacy, security, trust, etc.

BRIEF DESCRIPTION OF THE DRAWINGS

FIG. 2 depicts an exemplary user interface for template creation.
FIG. 6B depicts an exemplary distributed communications service.

DETAILED DESCRIPTION

Figure 1A:
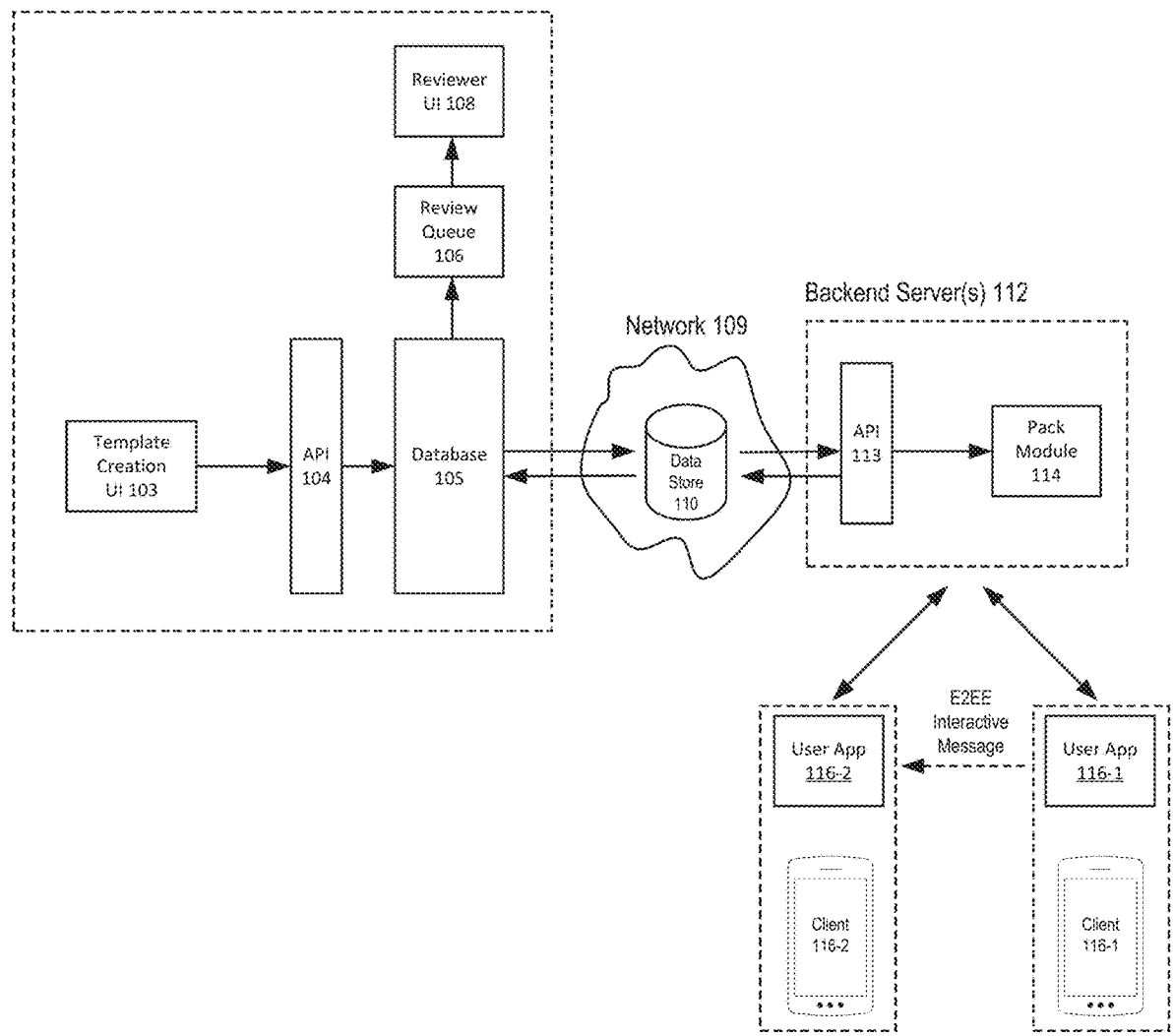
FIG. 1A depicts an exemplary communication system.

Exemplary embodiments are directed to techniques for sending interactive messages to one or more users of a communication system based on message templates via end-to-end encryption (E2EE). As will be further described in detail below, any recipient-specific information (e.g., personal information, sensitive information, etc.) in the interactive messages may be end-to-end encrypted and thus may be inaccessible by or hidden to backend servers or other intermediary system components at all times from transmission to reception of the message by the one or more recipients. E2EE may be understood to broadly include any technique where only the communicating end users can read or decipher the communicated messages, for example, by using cryptographic key(s) to decrypt the conversations.

According to embodiments, a first user (e.g., sender) of the communication system may want to send a second user (e.g., recipient) an interactive message. The first user may select a message template for sending the interactive message. The selection of the message template (e.g., template ID) and message content may be encrypted and then provided to one or more backend messaging servers. The one or more backend messaging servers may identify the second user as the recipient and send the encrypted message to the second user. The message may then be decrypted at the receiving side such that the second user can derive at least the template ID and message content. The template ID may be used to retrieve or obtain the correct message template and the appropriate portions or fields of the message template may then be "hydrated" or filled in with the recipient-specific information. The hydrated message template may then be rendered and displayed for the second user as the interactive message.

In examples, the message template may include a title, message content, a footer, and a predefined number of user-initiated actions (e.g., action icons), all of which may be formatted and designed in a specific way by the first user via a user interface. Moreover, the first user may design the template to include one or more images, videos, GIFs, digital content, media content, etc. The first user may specify in any manner (e.g., ID, flags, text, symbols, etc.) the one or more portions or fields of the message template that would include the recipient-specific information or other types of information to be end-to-end encrypted, which may be referred to as the "dynamic" portions of the message. The parts of the template that do not contain the recipient-specific information may be known as the static portions. Thus, before the message template is hydrated with the recipient-specific information on the receiving side, the message template may be referred to as a static template. It may be understood that all dynamic portions must remain end-to-end encrypted.

All message templates created and generated by the first user may be subject to backend review to at least ensure various communication system policies (e.g., spam policies) are met. For instance, human reviewers may manually review each template designed and submitted by the first user via a reviewer interface and either approve or reject the message templates based on messaging policy criteria. The approved message templates may be stored and catalogued in one or more backend storage devices. Further, upon approval of the message templates, "packs" may be generated, which may include one or more approved templates for the first user. These packs may also be stored in the backend storage devices.

In other instances, one or more trained machine learning models and/or neural networks may be used (either alone or in conjunction with human reviewers) to approve or reject the submitted message templates. For example, the machine learning model(s) and/or neural network(s) may be trained using datasets that include previously approved or rejected templates and/or data or information on current messaging policies.

While the end-to-end encryption of the dynamic portions of the interactive messages may be solely facilitated by or implemented on E2EE-based communication systems, it may be understood that any type of communication system (e.g., non-E2EE communication systems, hybrid communication systems including both non-E2EE and E2EE-based systems) may perform the interactive messaging for cross-platform or cross-system communication as long as the dynamic portions of the interactive message stay encrypted and inaccessible to intermediaries. At least the message templates described herein provide the mechanisms for such encryption.

The exemplary embodiments presented and described herein are advantageous in numerous ways. For example, message templates allow a user to send other users of a communication system interactive messages with dynamic portions thereof (e.g., message content containing personal, sensitive, or recipient specific information) end-to-end encrypted, which ensures at least message privacy and security. In another example, a user of the communication system may be empowered to create numerous message templates for different purposes each being able to support at least one type of interactive element, content, or media (e.g., images, video, GIFs, GPS, maps, PDF, etc.). Moreover, the backend review and approval of user-generated message templates for interactive messaging allows for better control, regulation, and enforcement of various policies (e.g., spamming policies) for the communication system.

A Note on Data Privacy

The above brief summary is intended to serve as a non-limiting introduction to the concepts discussed in more detail below. However, before discussing further exemplary embodiments, a brief note on data privacy is first provided. A more detailed description of the end-to-end encrypted interactive messaging techniques will be addressed in connection with the following Figures.

Some embodiments described herein make use of data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-$a$ may include components 122-1, 122-2, 122-3, 122-4, and 122-5. The embodiments are not limited in this context.

Exemplary System

FIG. 1A depicts an exemplary communication system 100 for at least end-to-end encrypted interactive messaging according to one or more embodiments. The communication system 100 may be part of or implemented in a messaging platform (e.g., social networking platform, social media platform, standalone messaging platform, etc.). The system 100 may include at least a web-based network 102, network 109 including one or more data stores 110, one or more backend servers 112, and one or more client devices 116-1, 116-2.

As shown, the web-based network 102 and the components thereof may at least support template creation and template review capabilities. For example, a template creation user interface (UI) 103 may be used by a template creator (e.g., user of the messaging platform) to create a message template. The template creation UI 103 may be used to create different type of message templates having different content, each of which may be used for different messaging purposes. Upon creation of each message template, it may be passed along to database 105 via application programming interface (API) 104. In examples, the database 105 may organize or catalogue all messaging templates such that they are associated with the correct creators, e.g., templates may be organized under creator identifiers (IDs) or specific subject or category (IDs). As will be further described in detail below, the various features and elements of the message template can be customized by the creator.

Each of the created message templates may then be sent or pushed to a review queue 106, which allows a human reviewer (e.g., messaging platform employee or representative) to review via a reviewer UI 108 the message templates to determine whether they conform to one or more policies of the messaging platform. For example, if either the formatting of the message template or content violate spamming policies, the human reviewer may reject the template. In other examples, the review may be performed by one or more machine learning models or neural networks alone or may be used in conjunction with the human review process. The machine learning model(s) or the neural networks may be trained using various types of training datasets that include examples of conforming message templates, rejected templates, and data or information related to why the templates were accepted or rejected, e.g., which messaging policies were implicated or violated.

As message templates are accepted or rejected, the database 105 may be updated in real time or near real time, e.g., rejected templates may be removed from the database 105. Moreover, computing components in the web-based network 102 may generate "packs" that contain at least template IDs corresponding to one or more up-to-date approved message templates. Unique packs (e.g., identified by a pack ID) may be generated for and correspond to each template creator. In some examples, the packs may be forwarded to and stored in the one or more data stores 110 of network 109, which may be retrieved by the pack module 114 of the backend servers 112, as will be further described below.

As further shown, a first user via sending client device 116-1 may send an end-to-end encrypted interactive message to a second user via receiving client device 116-2, which may be facilitated by at least the user app 116-1 (e.g., client-side software, client-side messaging application). The user app 116-1 may be hosted on or supported by one or more client-side servers associated with the first user. To send the E2EE interactive message, the first user via the client device 116-1 may make an application programming interface (API) call to the user app 116-1 indicating a specific template ID and the dynamic parameters it wants to send to the second user. The user app 116-1 may verify or determine whether a pack has been downloaded from the backend servers 112. As described above, the first user has a corresponding pack, which may be a collection of all approved message templates created by the first user. In examples, there may be a one-to-one mapping between the first user and the pack, where each pack has an assigned pack ID. If the pack is not downloaded, an API call is made to the backend servers 112 to retrieve the pack from the pack module 114.

Once the pack has been retrieved and available, the user app 116-1 may identify the correct template ID contained in the pack and then validates that the dynamic parameters to be sent in the message match the number and/or types of the expected parameters or the dynamic portions in the corresponding message template. In examples, validation in the other direction may also be implemented, e.g., the dynamic portions in the message template may be validated and matched against the dynamic parameters being sent in the message. The user app 116-1 then encrypts the entire message and sends the encrypted message. In examples, the encrypted message contains at least the template ID (and, in some instances, the pack ID) and the dynamic parameters. Advantageously, neither the template ID and the dynamic parameters can be seen or deciphered by the backend servers 112. The backend servers 112 may directly route the encrypted message to the second user.

In examples, the receiving client device 116-2 may receive and decrypt the encrypted message. Moreover, the receiving client device 116-2, via user app 116-2, may retrieve from the pack module 114 of the backend servers 112 the pack using the pack ID. Once the pack is retrieved, the message template can be obtained from the pack via the template ID and the dynamic portions of the static message template can by hydrated by plugging or filling in those portions with the dynamic parameters contained in the decrypted message. Thereafter, the hydrated message template may be rendered and displayed by the receiving client device 116-2 as the interactive message, including all of the interactive elements and icons. In at least that way, the interactive messaging process can advantageously remain end-to-end encrypted and thus highly secure and private.

It may be understood that the template creator may be the first user associated with user app 116-1 of sending client device 116-1. It may also be understood that the web-based network 102 may be a cloud-based network. Furthermore, it may be understood that the configuration of communication system 100 may not be limited to FIG. 1; rather, it is possible for the various components to be included, excluded, reside inside or outside the illustrated web-based network 102 and backend server(s) 112.

Exemplary Data Flow of E2EE Interactive Messaging

Figure 1B:
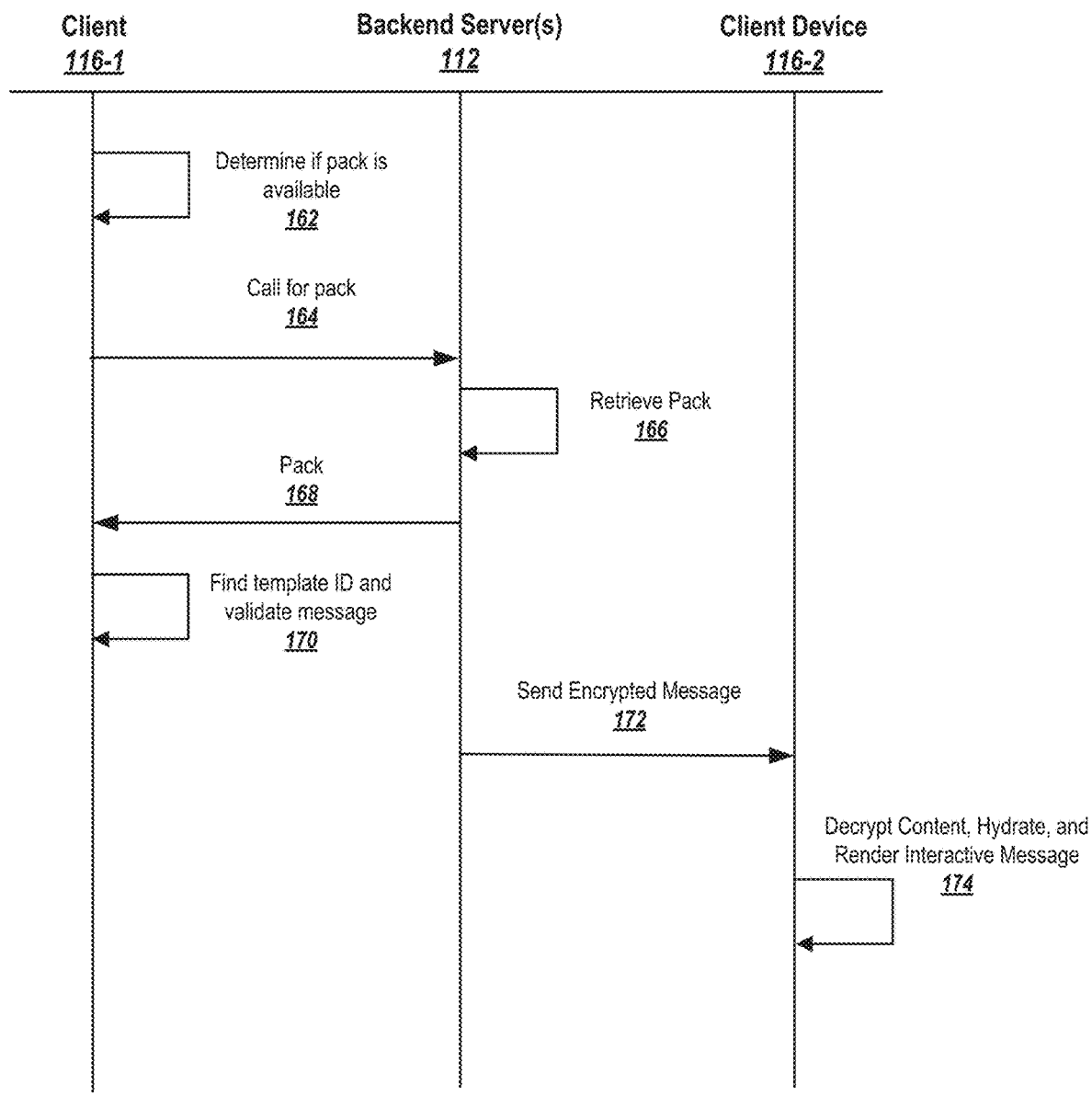
FIG. 1B depicts an exemplary data flow diagram.

FIG. 1B depicts an exemplary data flow diagram 160 according to one or more embodiments. For ease of explanation, the system 100 of FIG. 1A and the components thereof will be used to describe the features of the data flow diagram 160. The data flow diagram 160 shows the communicative interaction among at least the sending client device 116-1, the one or more intermediate/backend messaging servers 112, the receiving client device 116-2.

According to examples, the user of the sending client device 116-1 may initiate the interactive messaging process by selecting a message template and message content (including recipient-specific information) to be sent to the receiving client device 116-2. As described above, the message template may be a template that the user had previously designed using the template creation UI 103. The sending client device 116-1 may first determine whether the pack has been downloaded or has been otherwise made available at flow 162. If the pack has not been downloaded or is not available, the sending client device 116-1 may call, request, retrieve or download the pack at flow 164. The pack, as described above, may contain all of the approved message templates created by the sender and may also include all the template IDs associated with the approved message templates. The pack itself may be identified by a pack ID.

The backend servers 112 may locate the appropriate pack at flow 166 and send the pack at flow 168. Once the sending client device 116-1 has the pack, it may find the desired template ID in the pack and validate that the dynamic parameters (e.g., recipient-specific information) it wants to the send to the receiving client device 116-2 matches up with the dynamic portions of the message template corresponding to that template ID at flow 170. As set forth above, validation in the other direction may also be true, e.g., the dynamic portions in the message template may be validated and matched against the dynamic parameters being sent in the message. This may be to ensure that the static message template is properly hydrated and rendered at the receiving client device 116-2. The message, which may include at least the template ID, the pack ID, and the dynamic parameters, may be encrypted using one or more end-to-end encryption techniques (e.g., using a key-based exchange between the sending and receiving client devices) such that the backend servers 112 and any other intermediaries cannot read, decipher, or otherwise obtain at least the information contained therein. The backend servers 112 may identify the receiving client device 116-2 as the message recipient and send the encrypted message to the receiving client device 116-2 at flow 172.

The receiving client device 116-2 may receive the encrypted message at flow 174 and decrypt the message using, for instance, the exchanged key(s). The pack ID may be used to retrieve from the backend servers 112 the correct pack that contains the message template. Once the pack is obtained, the template ID may be used to retrieve the correct message template, which may be static at this point. The receiving client device 116-2 may then take the static message template and "hydrate" the dynamic portions thereof with the dynamic parameters that were provided in the decrypted message. The hydrated message template may then be rendered and displayed on the receiving client device 116-2 as the interactive message, which may include all of the recipient-specific information and the interactive elements.

In a different example (not shown in FIG. 1B), it may be possible for the sending client device 116-1 to retrieve beforehand the pack from the backend servers 112 and pre-hydrate a message template with the dynamic parameters(e.g., the recipient sensitive information), encrypt the entire message, and send it to the receiving client device 116-2 via the backend servers 112.

Accordingly, the end-to-end encryption of the message between the sending and receiving client devices ensures at least that the interactive messages are exchanged in a highly private and secure manner. Template creation, template formats, template review, template hydration, and template rendering will now be further described in detail below.

Exemplary Template Creation

FIG. 2 depicts an exemplary template creation user interface (UI) 201 according to one or more embodiments. The template creation UI 201 may be similar to the template creation UI 103 described above with respect to FIG. 1A. In examples, a template creator may use the template creation UI 201 on any computing device to generate a message template. The template creator may be a business entity (e.g., eyewear business) and the message template may be used for a shipping confirmation message typically sent to each customer who orders a product from the business. It may be understood that both the business entity (the template creator) and the customers may be users of the messaging platform. It may further be understood that the message template may be the structure or framework for providing at least the backend messaging components (e.g., backend servers) the necessary information to allow users of the messaging platform to message interactively.

As shown, the creator can customize different sections of the message template, such as a header 202, message body 204, footer 206, and interactive buttons 208. The header may be the title of the interactive message. In examples, the title may be character limited (e.g., max 120 characters). The creator can simply enter the text of the title in the text box, or in other instances, can attach a media item if the title will be represented by an image or the like.

The message body 204 may include the main content of the interactive message. As further shown, the body of the interactive message may recite "Hello, [name of customer]—Your package has shipped to your address at [specified customer shipping address]. Your tracking number is [tracking number]." Because the name of the customer, the shipping address, and tracking number are specific to the customer and potentially sensitive, all of this information may be required to be end-to-end encrypted when the interactive message is sent from the business entity to the customer. To specify a placeholder for the recipient-specific information, the template creator may use any indicator (e.g., ID, flags, text, symbols). As illustrated, for example, the placeholders may be specified by a specific indicator, such as double curly brackets with a specific number within the brackets. Each different recipient-specific information may be specified by a different number. As will be further described below, the recipient messaging app will decrypt and hydrate these placeholders with the recipient-specific information when the interactive message is actually rendered and displayed to the recipient. Moreover, other various items may be included in the message body, such as media elements (e.g., images, videos, GIFs, PDFs, audio files, GPS).

The template creator may also customize the footer 206 of the message template, which may be arranged or placed at the bottom of the interactive message. Interactive buttons 208 or icons may also be customized by the creator. The buttons 208 may perform different functions. For example, the template creator can customize a first button to allow the recipient to call a phone number. As shown the text description for that button can be "call us" and the actual phone number can also be provided. In another example, a second button may be configured such that, when pressed or selected, the recipient can be hyperlinked to a website, such as the website for the eyewear business. In another example, a third button can be configured to hyperlink the recipient to a "help center" webpage. The template creator, in some instance, may be required to provide the actual phone numbers and URLs for review to ensure they meet anti-spamming policies.

Once the message template has been customized via the template creation UI 201. The templated message can be rendered and previewed as the interactive message in the preview window 210, as shown. The rendered interactive message displayed in the preview window 210 may be similar or substantially the same as the interactive message the recipient would see when rendered and displayed on the recipient's computing device. Upon finalization, the template creator may then submit the message template by selecting or pressing the "submit" icon, which causes the message template to be pushed to a review queue and in front of a reviewer (either human or artificial) as described above.

Exemplary Template Formats

Figure 3A:
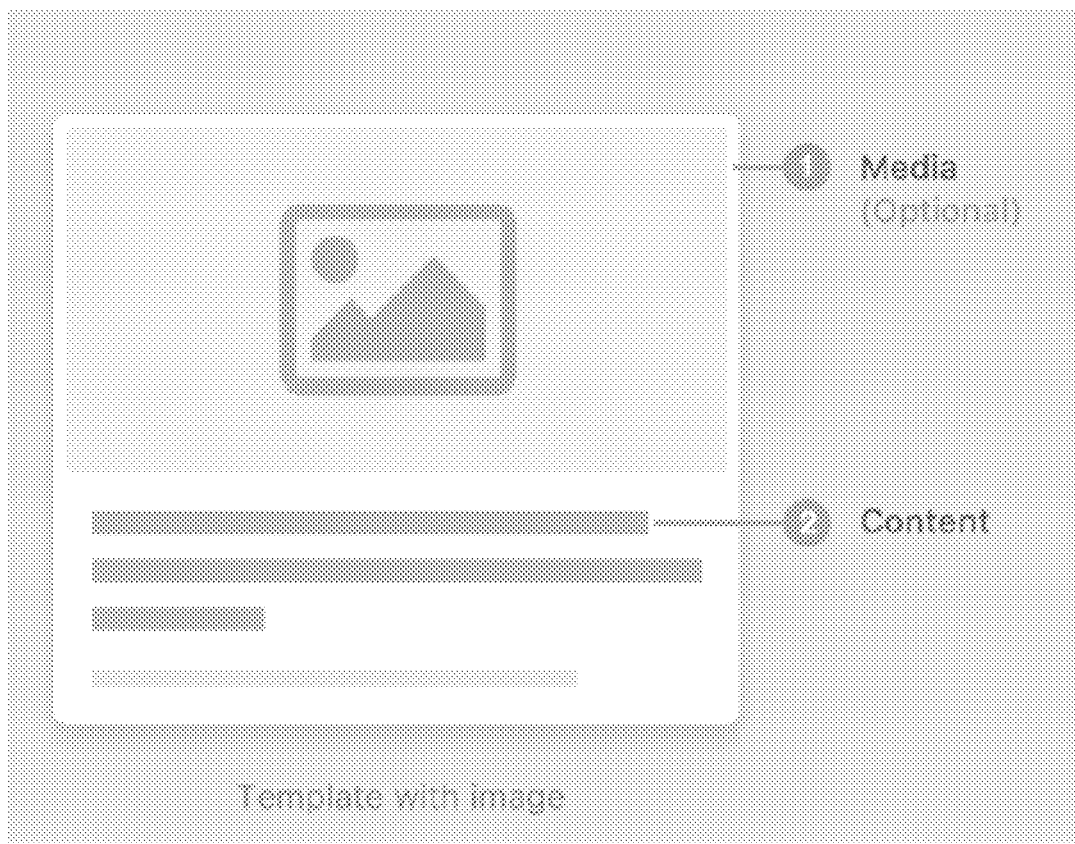
FIG. 3A depicts a first exemplary message template.
Figure 3B:
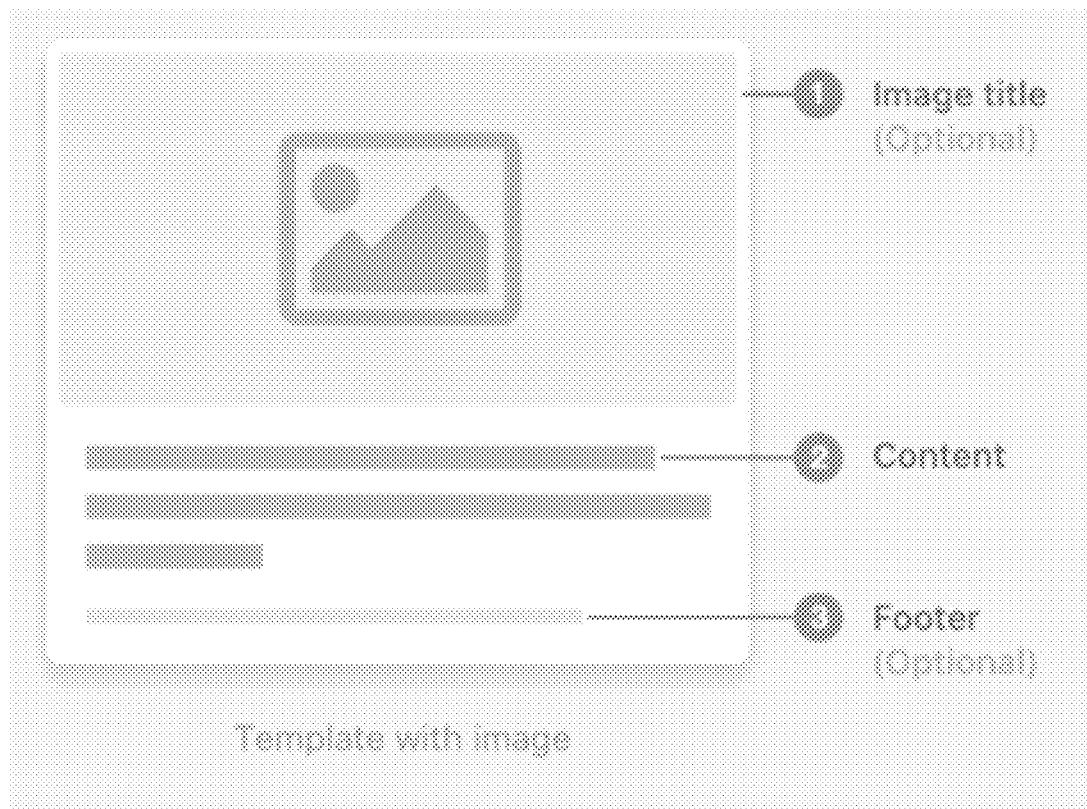
FIG. 3B depicts a second exemplary message template.

Message templates can be formatted in various ways. FIGS. 3A to 3B depict different template formats for the interactive messages according to one or more embodiments. For example, as shown in FIG. 3A, the message template can be formatted such that there are at least two parts: a media portion, which includes an image in the depicted example, and a message content portion. The media portion of the template may include or support any type of media, such as images, videos, documents, attachments PDFs, GIFs, GPS, location, etc., which can be mixed and matched. For instance, the media content may be flight tickets, boarding passes, movie tickets, concert tickets, notices, confirmations, reminders financial forms, videos for new employee onboarding, product videos, walkthroughs and tours, etc. It is understood that there are many different possible ways of businesses to effectively communicate with its customers via the messaging platform using interactive messages that contain these types of media content. In further examples, the message content portion may contain information being sent to the recipient with the media in the media portion and may contain placeholders for recipient-specific information. The information in the message content portion can be character limited (e.g., 160 max characters long).

FIG. 3B is another example template format. Similar to FIG. 3A, the message template can be formatted such that there are the media and message content portions, but the template may further include a title portion for the title of the image and a footer portion that may be arranged at the bottom of the template.

Figure 3C:
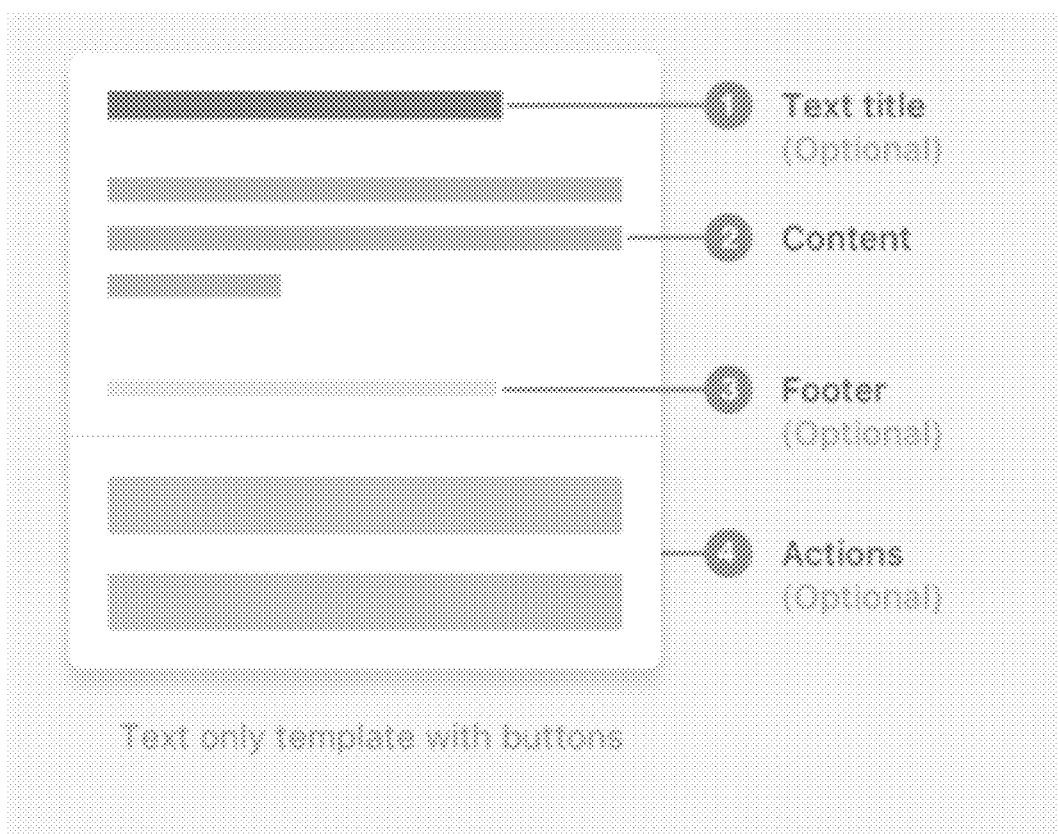
FIG. 3C depicts a third exemplary message template

FIG. 3C depicts yet another example template format according to embodiments. The illustrated template format may have four different parts: a title or header, message content, footer, and one or more action elements, which may be consistent with the four customizable sections depicted and described above in the template creation UI with respect to FIG. 2. The title portion may be arranged at the very top of the template, then the message content section immediately below the title section, the footer below the message content, and the action elements at the very bottom of the template.

As described above, the action elements may be icons or buttons that allow the recipient (e.g., customer) to interact with the sender (e.g., business). For instance, an action element may be configured to enable a recipient of the interactive message to select or click an icon to call a business or open a URL. When the calling action is selected, the phone number may be loaded onto a dialer of the mobile device such that the user can simply press the dial button on the dialer. In other instances, an action element may be a quick reply button or icon, which allows the recipient to reply to the sender using a single action, such as confirming an appointment, accepting or declining, location sharing, etc.

Exemplary Template Review

Figure 4:
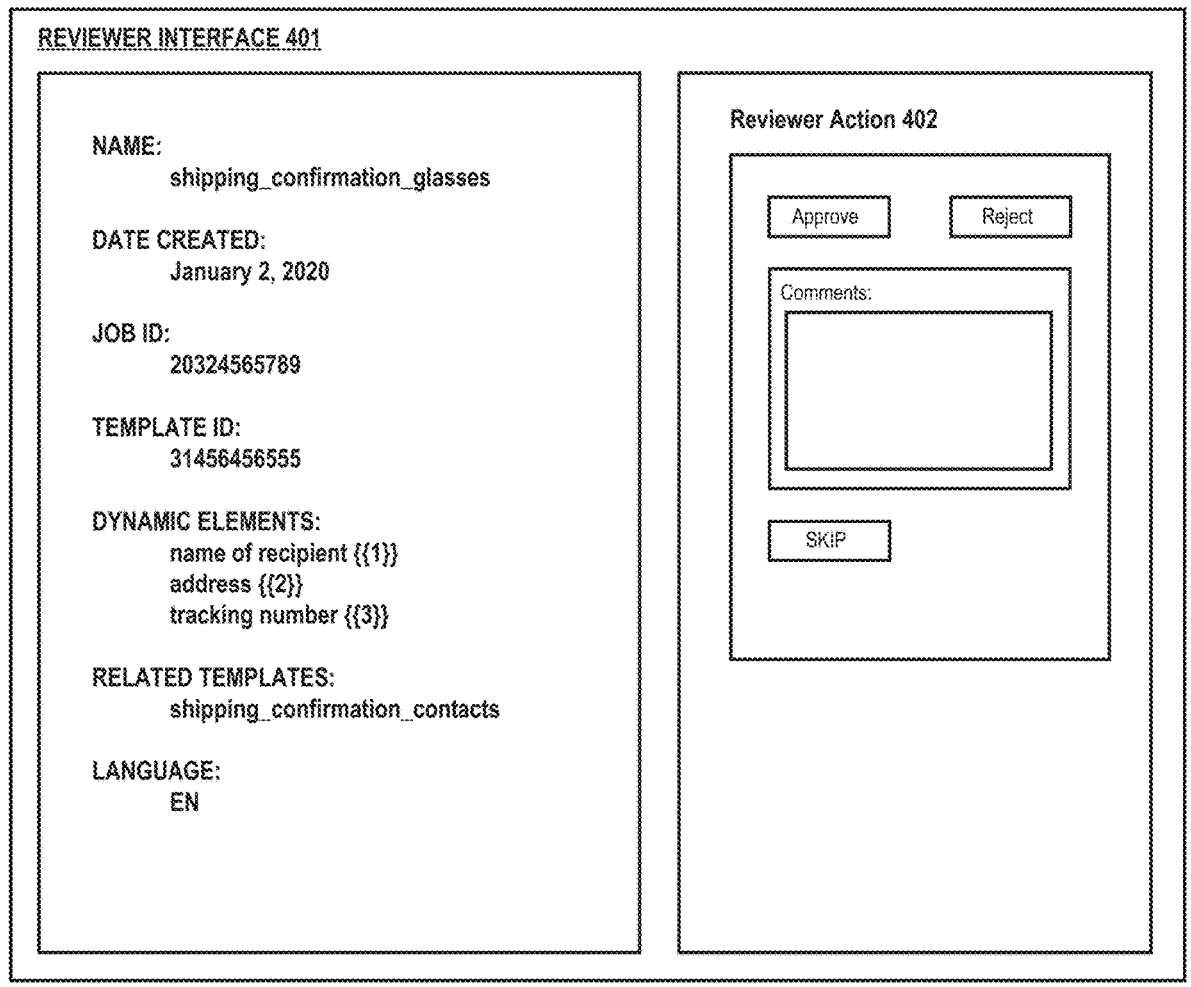
FIG. 4 depicts an exemplary user interface for reviewing templates.

FIG. 4 depicts an exemplary reviewer interface 401 according to one or more embodiments. As described above, human reviewers on the backend side of the messaging platform may review and either approve or reject message templates that have been created and submitted by template creators. As already set forth above, it may be understood that the template creators may be business-users on the messaging platform.

For each template to be reviewed, various types of information related to the message template may be populated on the reviewer interface 401. For ease of explanation, the message template that was created on template creation UI 201 will be used to describe the features of FIG. 4. As shown, the name of the template, date created, identifiers (e.g., job ID, template ID), dynamic elements, related templates, and language information may be displayed for the reviewer. For example, the name of the template may be "shipping_confirmation_glasses" created on Jan. 2, 2020. The dynamic elements may be the parameters that are recipient-specific, such as information contained in the message content, e.g., name of recipient, address of recipient, and tracking number associated with the package. The placeholders for the recipient-specific information, e.g., the information encrypted from the business-user side to the recipient side, may be specified by the double curly brackets with an identifier within the brackets, as described above.

As further shown, the reviewer interface 401 may display that "shipping_confirmation_contacts" is a related message template, which may be the standard interactive message template used when confirming the shipment of contact lenses. After review, if the message template meets the predefined messaging policies (e.g., anti-spamming policies), or alternatively, if the message template does not violate any messaging policies, then the reviewer may approve the message template by selecting or pressing the "approve" icon. The "reject" icon may be selected or pressed if the message template is rejected based on the review. Moreover, the reviewer may input any comments in the comments box, and may also skip the review and return at a later time if desired.

According to further embodiments, the review of the message templates may be performed by one or more machine learning models and/or one or more neural networks (which may be referred to as artificial review). For example, the machine learning model(s) may implement or include supervised learning, unsupervised learning, reinforcement learning, semi-supervised learning, self-supervised learning, multi-instance learning, inductive learning, deductive learning, transductive learning, multi-task learning, active learning, online learning, transfer learning, ensemble learning, etc. and may be based on classification, linear regression, logistic regression, random forest, Bayesian inference, etc. prediction algorithms.

The machine learning model(s) and/or the neural network(s) may be trained using training datasets, which may include various types of example templates, e.g., templates that have been approved, templates that have been rejected, templates that violate one or more messaging policies, templates that meet the one or more messaging policies, information related to the messaging policies, review tendencies or patterns of various human reviewers, etc. It may be understood that artificial review may be used in conjunction with human review, or in other examples, only the artificial review may be used.

Exemplary Hydration

Figure 5A:
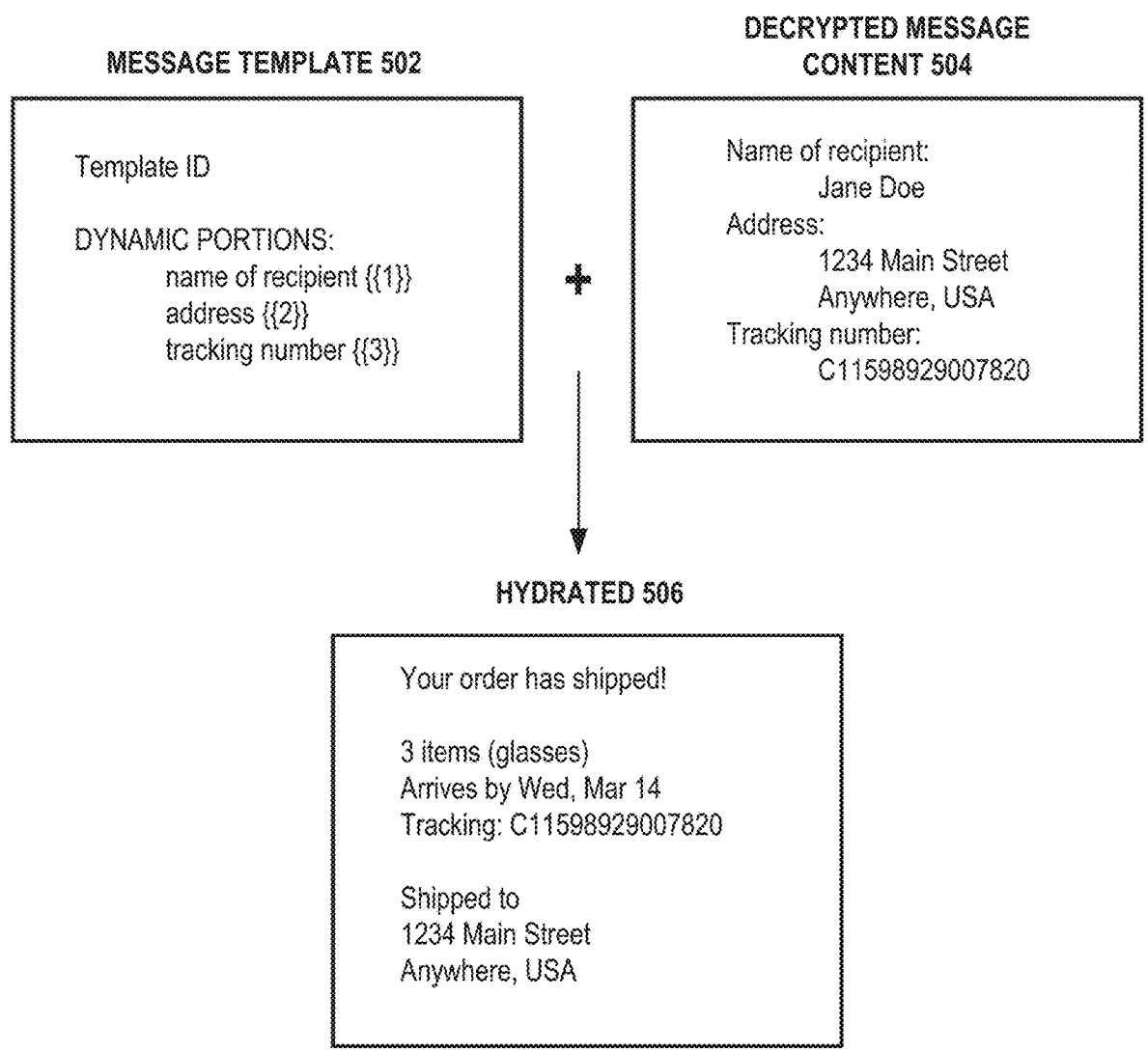
FIG. 5A depicts an exemplary template hydration.

FIG. 5A depicts an exemplary template hydration according to one or more embodiments. As described above, template hydration may be the process in which the receiving client device fills in or "hydrates" the recipient-specific information placeholders (e.g., the dynamic portions) with decrypted content (e.g., the dynamic parameters).

For example, and as described above, the receiving client device (e.g., the customer) may receive an encrypted message. The encrypted message may be decrypted by the receiving client device using at least a key of the end-to-end encryption scheme employed by the communicating parties such that at least the decrypted content 504 can be derived or obtained. The decryption of the message may also reveal a pack ID and a template ID. The pack ID may be used to retrieve from backend servers the correct pack, and the message ID may be used to retrieve message template 502 from the pack. The message template 502 may be static and contain preconfigured template elements (e.g., elements part of the template not required to be end-to-end encrypted—such as standard media content, images, videos, standard text—"Your order has shipped!"), and further specify the dynamic portions, e.g., the placeholders, that are to be filled in or hydrated with the dynamic parameters provided in the decrypted message content 504, e.g., recipient-specific information.

As shown, the message template 502 may define the dynamic portions by way of, for example, placeholders {{1}}, which is a placeholder for the name of the recipient (the customer), {{2}}, which is a placeholder for the recipient's shipping address, and {{3}}, which is a placeholder for the tracking number of the sent package, as described above. The corresponding information from the decrypted message content 504 may be identified or retrieved for hydration. For instance, "Jane Doe" is the name of the recipient and matches to or corresponds with placeholder {{1}}, 1234 Main Street Anywhere USA" is the recipient's shipping address and matches to placeholder {{2}}, and "C11598929007820" is the tracking number and matching to placeholder {{3}}. It may be understood that the sending client device can key or flag all of this information in the encrypted message to the correct placeholders such that the receiving client device can automatically match the corresponding recipient-specific information to the appropriate placeholders in a quick and efficient manner.

As further illustrated, the static message template 502 can be hydrated with the decrypted recipient-specific information to generate a hydrated form 506 of the message template. The hydrated form 506 may then be used by the receiving client device to render and display the final interactive message on the device. Advantageously, by way of at least the message template and hydration thereof, it is possible for users of the messaging platform to at least communicate interactive messages, which are informative and useful for the users, while keeping the dynamic portions (e.g., the sensitive and private aspects) of the message end-to-end encrypted. Moreover, the message template and the hydration of the dynamic portions of the template make it possible for a single business-user to send the same type of interactive messages to numerous customers without the process of doing so being a burden on the business-user.

It is understood that the hydration process can be performed by any messaging platform or communication system, even if it is not primarily an end-to-end encryption-based platform or system. Thus, end-to-end encrypted interactive messaging is possible on cross-platform or cross-system architectures. Moreover, while placeholders are illustrated to describe the hydration process, any suitable technique may be used to signify that parts of the message template need to be filled in or hydrated with recipient-specific information, such as symbols, identifiers, text, code, unique languages, etc.

Exemplary Rendered Interactive Messages

Figure 5B:
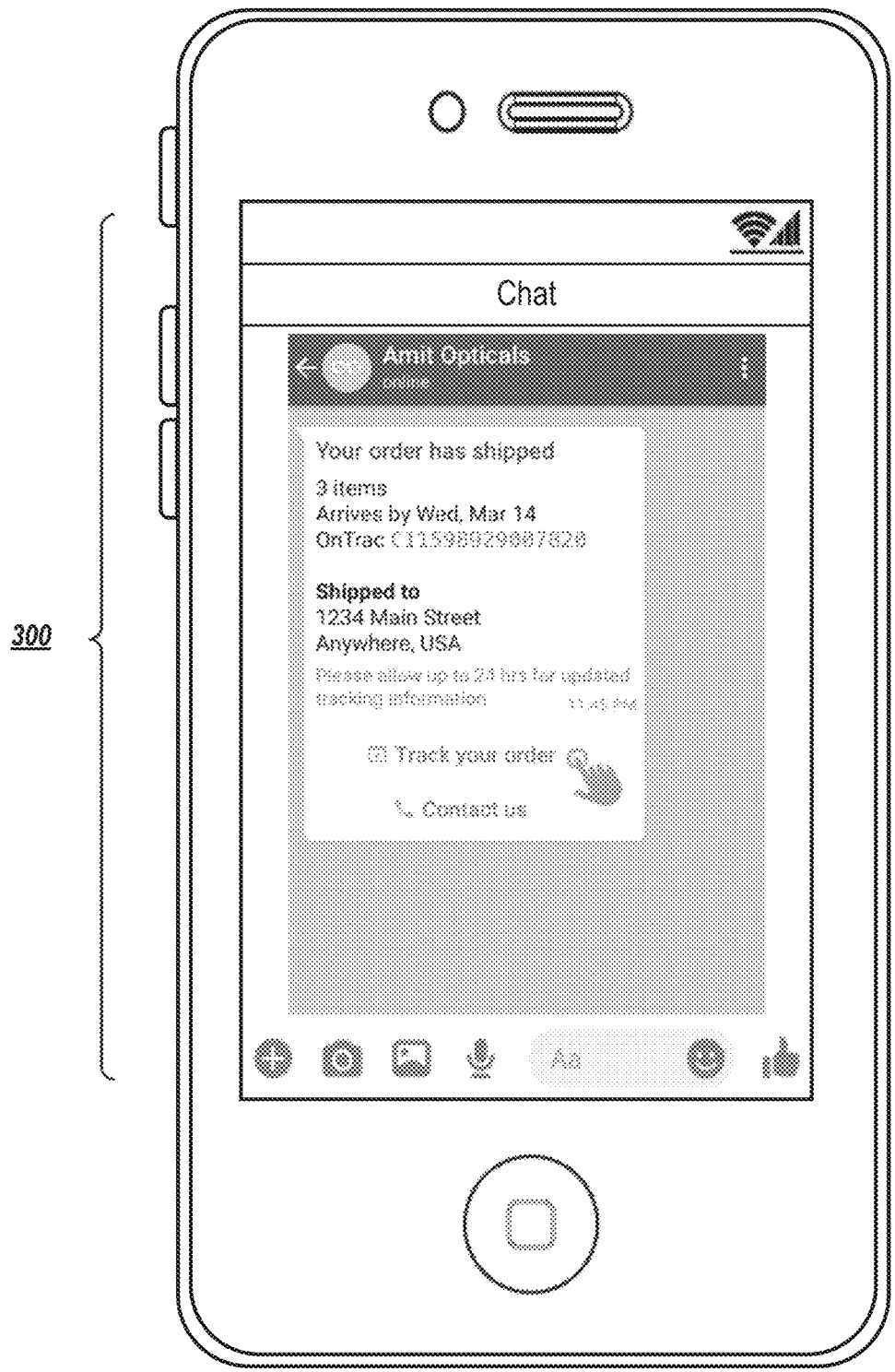
FIG. 5B depicts a first exemplary rendered interactive message.
Figure 5C:
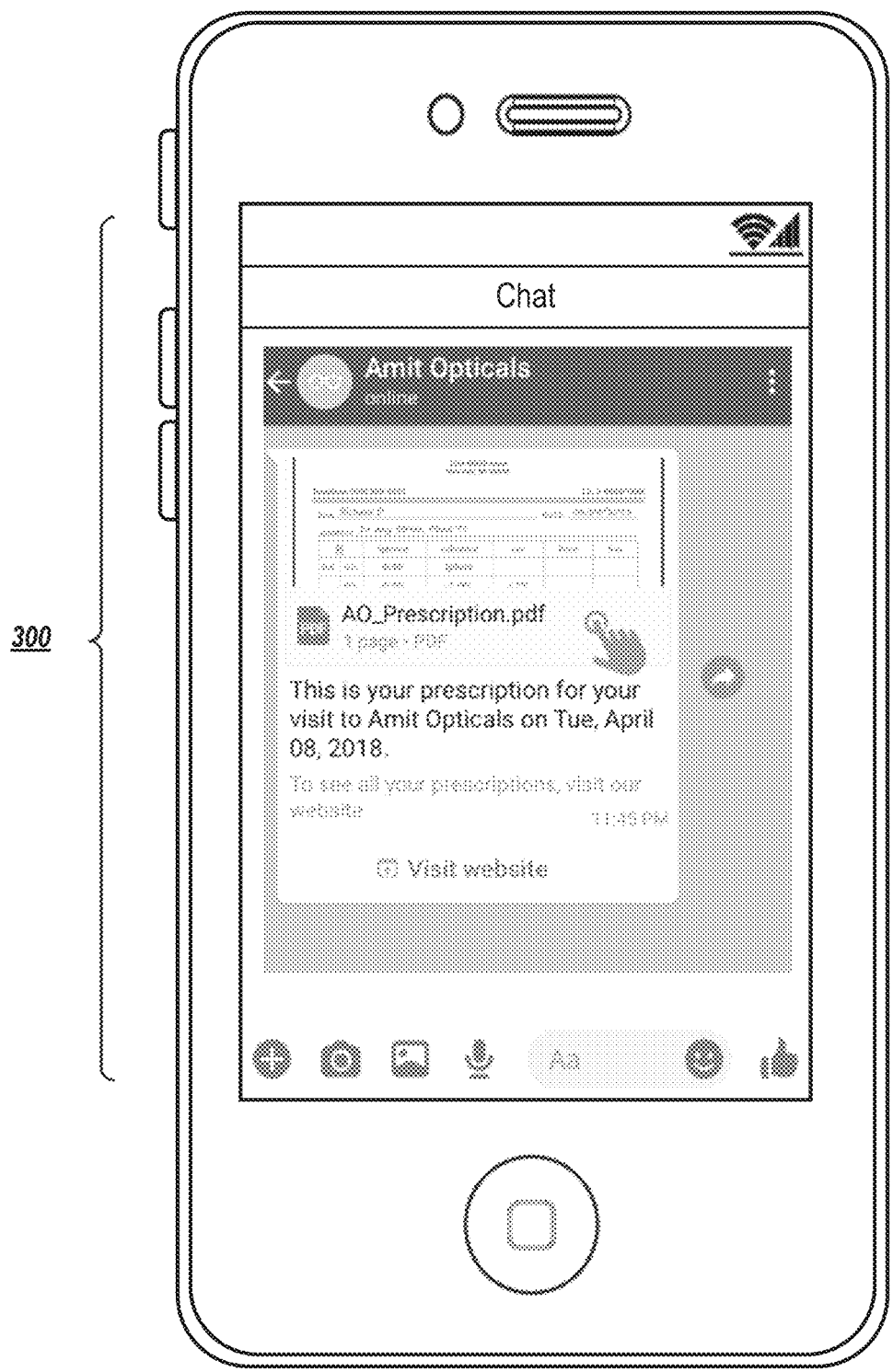
FIG. 5C depicts a second exemplary rendered interactive message.

FIGS. 5B and 5C depict exemplary rendered interactive messages according to one or more embodiments. FIG. 5B shows the interactive message that was rendered from the message template created, approved, and hydrated in FIGS. 2, 4, and 5A, respectively. When rendered and displayed on the messaging interface of the receiving client device, the interactive message looks like any other message that the recipient would receive from other users. The message specifies that the recipient's three-item order has shipped with an estimated arrival time of Wednesday March 14. Moreover, some of the hydrated recipient-specific information is also displayed in the message, such as the tracking number and the shipping address of the recipient. At the bottom of the interactive message, two action icons may be displayed and selectable by the user. For example, if the recipient wants to view specific tracking information, the recipient may select the "track your order" icon. In another example, if the recipient wanted to contact the eyewear business, the recipient may do so by selecting the "contact us" icon.

FIG. 5C shows a different example of an interactive message. As shown, the interactive message may contain a selectable PDF file. For example, the entire PDF file may be end-to-end encrypted during message transmission and decrypted by the receiving client device. The message template can then be hydrated with the decrypted PDF file and rendered as the interactive message. The recipient may open the PDF file by selecting or tapping the file icon in the interactive message. Also shown is a "visit website" icon at the bottom of the message for further interaction by the recipient.

Exemplary Logic

Exemplary logic for implementing the above-described embodiments is next described in connection with FIG. 5D. The exemplary logic may be implemented in hardware, software, or a combination of hardware and software (e.g., being implemented at least partially in hardware).

Figure 5D:
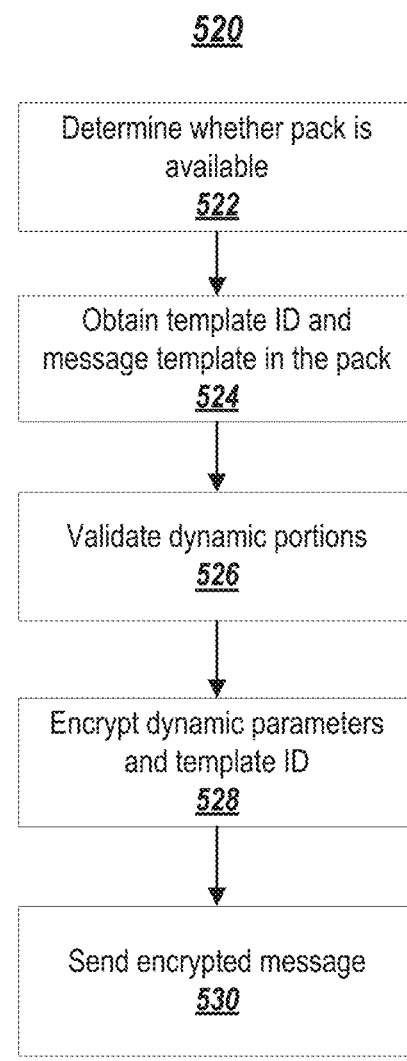
FIG. 5D depicts an exemplary flow diagram for E2EE interactive messaging.

FIG. 5D is a flowchart depicting exemplary logic 520 for the end-to-end encrypted interactive messaging, as described above. The logic 520 may be embodied as digital logic, which may be implemented at least partially in hardware, embodying instructions for a processor circuit to perform the steps described below. Although FIG. 5D depicts a particular arrangement of logical elements in a particular order, it is understood that the configuration depicted in FIG. 5D is but one example. In other embodiments, more elements may be provided and/or some elements may be omitted, some elements may be performed in parallel, and/or elements may be performed in a different order.

A first user of the messaging platform (e.g., a business) may want to send a second user (e.g., a customer) an interactive message. A sending client device may make an API call to a business client (e.g., sending client app or software hosted on sending client hardware) indicating that it wants to send the second user an interactive message, wherein the indication may identify a template identifier associated with a message template and one or more dynamic parameters (e.g., recipient-specific information).

At block 522, the business client may determine whether the pack has been downloaded in local memory or cache. As described above, the pack may contain all approved message templates associated with the business and the corresponding template identifiers for the templates. The pack itself may have an associated pack identifier.

At block 524, if the pack is not available or has not been downloaded or retrieved, the business client may perform an API call to the backend messaging servers to retrieve the pack. Once the pack has been retrieved and available, the business client may find the template identifier contained in the pack and locate the associated message template. As described above, the message template may contain at least dynamic and static portions. The static portions are parts of the message template that do not change, e.g., header, footer, interactive elements, buttons, images, media content, video, etc. The dynamic portions may be represented by placeholders that can be filled in with dynamic parameters, such as recipient-specific information.

At block 526, the dynamic portions of the message template may be validated against the one or more dynamic parameters being sent to the customer so that it can be ensured that the dynamic portions can be hydrated correctly with the appropriate parameters when the message template is hydrated on the receiving side. The number of dynamic portions may be compared against the number of dynamic parameters being sent. If they do not match, the validation fails. If the types of the parameters and portions do not match, validation may fail.

At block 528, at least the dynamic parameters and the template identifier (and in some instances the pack identifier) may be encrypted together as an encrypted message. In examples, the encryption scheme used may be E2EE-based and known to the communicating parties. In at least that regard, the backend messaging servers or any other intermediaries cannot decrypt or decipher the information being sent in the encrypted message. At block 530, the encrypted message is sent to the second user—the customer.

While the above described examples primarily describe the hydration process being performed at the receiving side, it may not be limited thereto. For example, the sender may hydrate a message template with recipient-specific information in the dynamic portions of the message template it had already received or retrieved from the backend server(s) of the messaging platform. Thereafter, the entire already-hydrated message can be encrypted and then sent to the recipient for decryption and rendering.

Communications System Overview

Figure 6A:
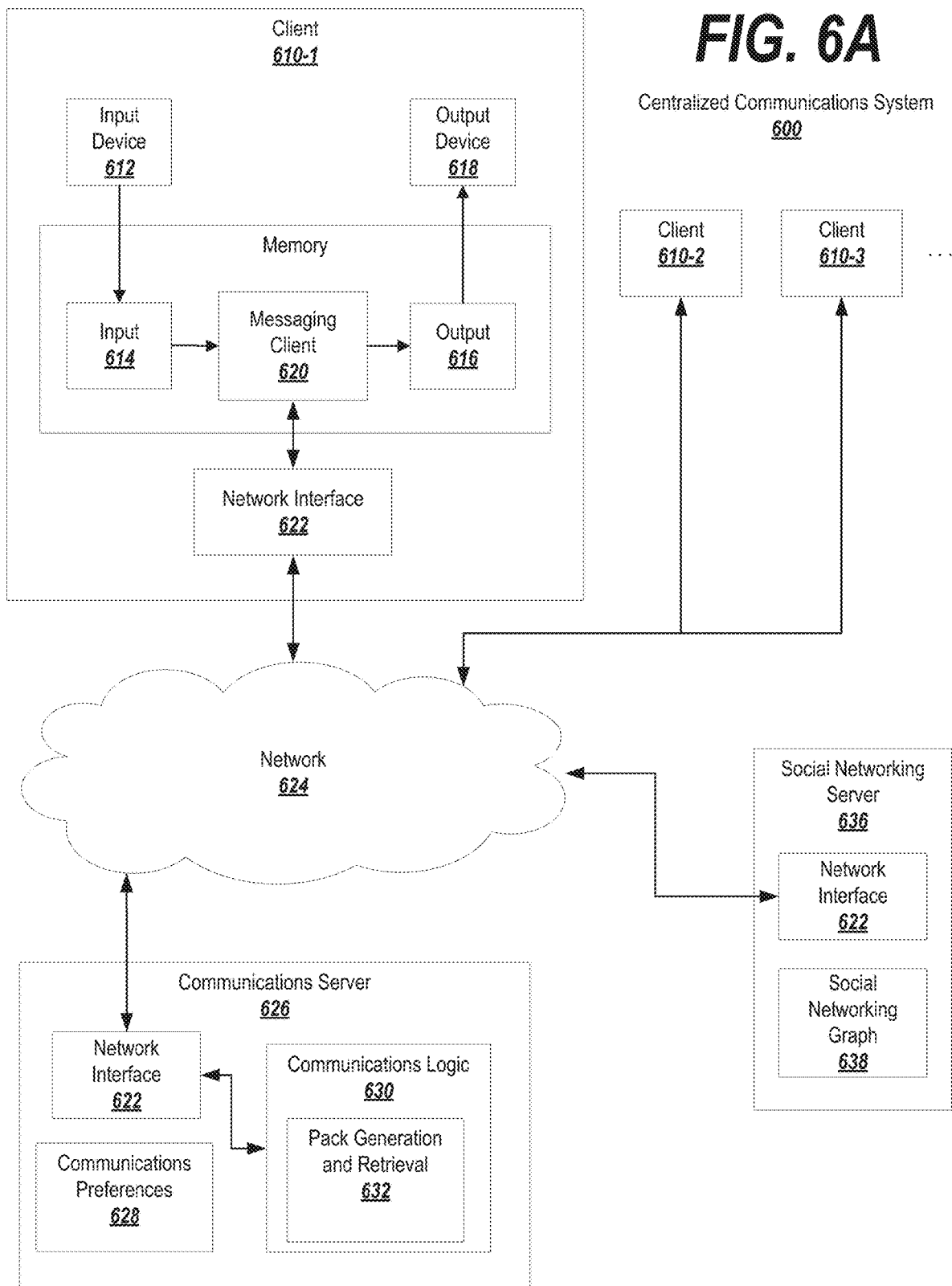
FIG. 6A depicts an exemplary centralized communications service.

These examples may be implemented by a communications system that is provided locally, at a client device, or remotely (e.g., at a remote server), or some combination thereof. FIGS. 6A and 6B depict various examples of communications systems, and are discussed in more detail below.

FIG. 6A depicts an exemplary centralized communications system 600, which facilitates encrypted communication between two or more users (e.g., business and customer). The centralized system 600 may implement some or all of the structure and/or operations of a messaging or communications service in a single computing entity, such as entirely within a single centralized messaging server device, e.g., communications server 626.

The communications system 600 may include a computer-implemented system having software applications that include one or more components. Although the communications system 600 shown in FIG. 6A has a limited number of elements in a certain topology, the communications system 600 may include more or fewer elements in alternate topologies.

A communications system 600 may be generally arranged to receive, store, and deliver communications, such as messages. The communications may include or may be associated with media or content items.

A client device 610 may transmit communications addressed to one or more recipient users, user accounts, or other identifiers resolving to receiving client devices 610. In exemplary embodiments, each of the client devices 610 and their respective messaging clients 620 are associated with a particular user or users of the communications service 600. In some embodiments, the client devices 610 may be cellular devices such as smartphones and may be identified to the communications service 600 based on a phone number associated with each of the client devices 610. In some embodiments, each client may be associated with a user account registered with the communications service 600. In general, each client may be addressed through various techniques for the reception of communications. While in some embodiments the client devices 610 may be cellular devices, in other embodiments one or more of the client devices 610 may be personal computers, tablet devices, any other form of computing device.

The client 610 may include one or more input devices 612 and one or more output devices 618. The input devices 612 may include, for example, microphones, keyboards, cameras, electronic pens, touch screens, and other devices for receiving inputs including message data, requests, commands, user interface interactions, selections, and other types of input. The output devices 618 may include a speaker, a display device such as a monitor or touch screen, and other devices for presenting an interface to the communications system 600.

The client 610 may include a memory, which may be a non-transitory computer readable storage medium, such as one or a combination of a hard drive, solid state drive, flash storage, read only memory, or random-access memory. The memory may a representation of an input 614 and/or a representation of an output 616, as well as one or more applications. For example, the memory may store a messaging client 620 and/or a social networking client that allows a user to interact with a social networking service.

The input 614 may be textual, such as in the case where the input device 612 is a keyboard. Alternatively, the input 614 may be an audio or video recording, such as in the case where the input device 612 is a microphone or camera.

The input 614 may be subjected to automatic speech recognition (ASR) logic in order to transform the audio recording to text that is processable by the communication system. The ASR logic may be located at the client device 610 (so that the audio recording is processed locally by the client 610 and corresponding text is transmitted to the communications server 626), or may be located remotely at the communications server 626 (in which case, the audio recording may be transmitted to the communications server 626 and the communications server 626 may process the audio into text). Other combinations are also possible—for example, if the input device 612 is a touch pad or electronic pen, the input 614 may be in the form of handwriting, which may be subjected to handwriting or optical character recognition analysis logic in order to transform the input 612 into processable text.

The client 610 may be provided with a network interface 622 for communicating with a network 624, such as the Internet. The network interface 622 may transmit the input 612 in a format and/or using a protocol compatible with the network 624 and may receive a corresponding output 616 from the network 624.

The network interface 622 may communicate through the network 624 to a communications server 626, which may be operative to receive, store, and forward messages between messaging clients.

The communications server 626 may include a network interface 622, communications preferences 628, and communications logic 630. The communications preferences 628 may include one or more privacy settings for one or more users and/or video communications. For example, the communications preferences 628 may include one or more settings, including default settings, for the logic described herein.

The communications logic 630 may include pack generation and retrieval logic 632 for generating and retrieving message packs to be sent to respective recipients (along with encrypted message content) such that the receiving client devices can appropriately hydrate the message templates and render the interactive messages, as described above.

The network interface 622 of the client 610 and/or the communications server 626 may also be used to communicate through the network 624 with a social networking server 636. The social networking server 636 may include or may interact with a social networking graph 638 that defines connections in a social network. Furthermore, the communications server 626 may connect to the social networking server 636 for various purposes, such as retrieving connection information, messaging history, event details, etc. from the social network.

A user of the client 610 may be an individual (human user), an entity (e.g., an enterprise, business, or third-party application), or a group (e.g., of individuals or entities) that interacts or communicates with or over the social networking server 636. The social-networking server 636 may be a network-addressable computing system hosting an online social network. The social networking server 636 may generate, store, receive, and send social-networking data, such as, for example, user-profile data, concept-profile data, social-graph information, or other suitable data related to the online social network. The social networking server 636 may be accessed by the other components of the network environment either directly or via the network 624.

The social networking server 636 may include an authorization server (or other suitable component(s)) that allows users to opt in to or opt out of having their actions logged by social networking server 636 or shared with other systems (e.g., third-party systems, such as the communications server 626), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social networking server 636 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 638. Privacy settings of a social-graph element, such as a node or an edge, may specify how the social-graph element, information associated with the social-graph element, or content objects associated with the social-graph element can be accessed using the online social network. As an example, and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 636 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 636 may send a request to the data store for the object. The request may identify the user associated with the request. The requested data object may only be sent to the user (or a client system 610 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social networking server 636 or explicit connections of a user to a node, object, entity, brand, or page on social networking server 636. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 6A may be well-suited to deployment as a new system or as an upgrade to an existing system, because the logic is incorporated into the communications server 626. In contrast, FIG. 6B depicts an exemplary distributed communications system 650, in which functionality for selecting dominant/relevant participants and displaying a reduced-size interface is distributed and remotely accessible from the messaging server. Examples of a distributed system 650 include a client-server architecture, a 3-tier architecture, an N-tier architecture, a tightly coupled or clustered architecture, a peer-to-peer architecture, a master-slave architecture, a shared database architecture, and other types of distributed systems.

Many of the components depicted in FIG. 6B are identical to those in FIG. 6A, and a description of these elements is not repeated here for the sake of brevity. The primary difference between the centralized embodiment and the distributed embodiment is the addition of a separate messaging server (pack server) 652, which hosts the relevant messaging logic (pack generation and retrieval logic) 632. The messaging server 652 may be distinct from the communications server 626 but may communicate with the communications server 626, either directly or through the network 624, to provide the functionality of the messaging logic 632 to the communications server 626.

The embodiment depicted in FIG. 6B may be particularly well suited to allow exemplary embodiments to be deployed alongside existing messaging or communication systems, for example when it is difficult or undesirable to replace an existing messaging server. Additionally, in some cases the communications server 626 may have limited resources (e.g. processing or memory resources) that limit or preclude the addition of the additional pivot functionality. In such situations, the capabilities described herein may still be provided through a separate messaging server, such as the messaging server 652.

Messaging Architecture

The embodiments described above may be performed by a messaging architecture, an example of which is next described with reference to FIG. 7.

Figure 7:
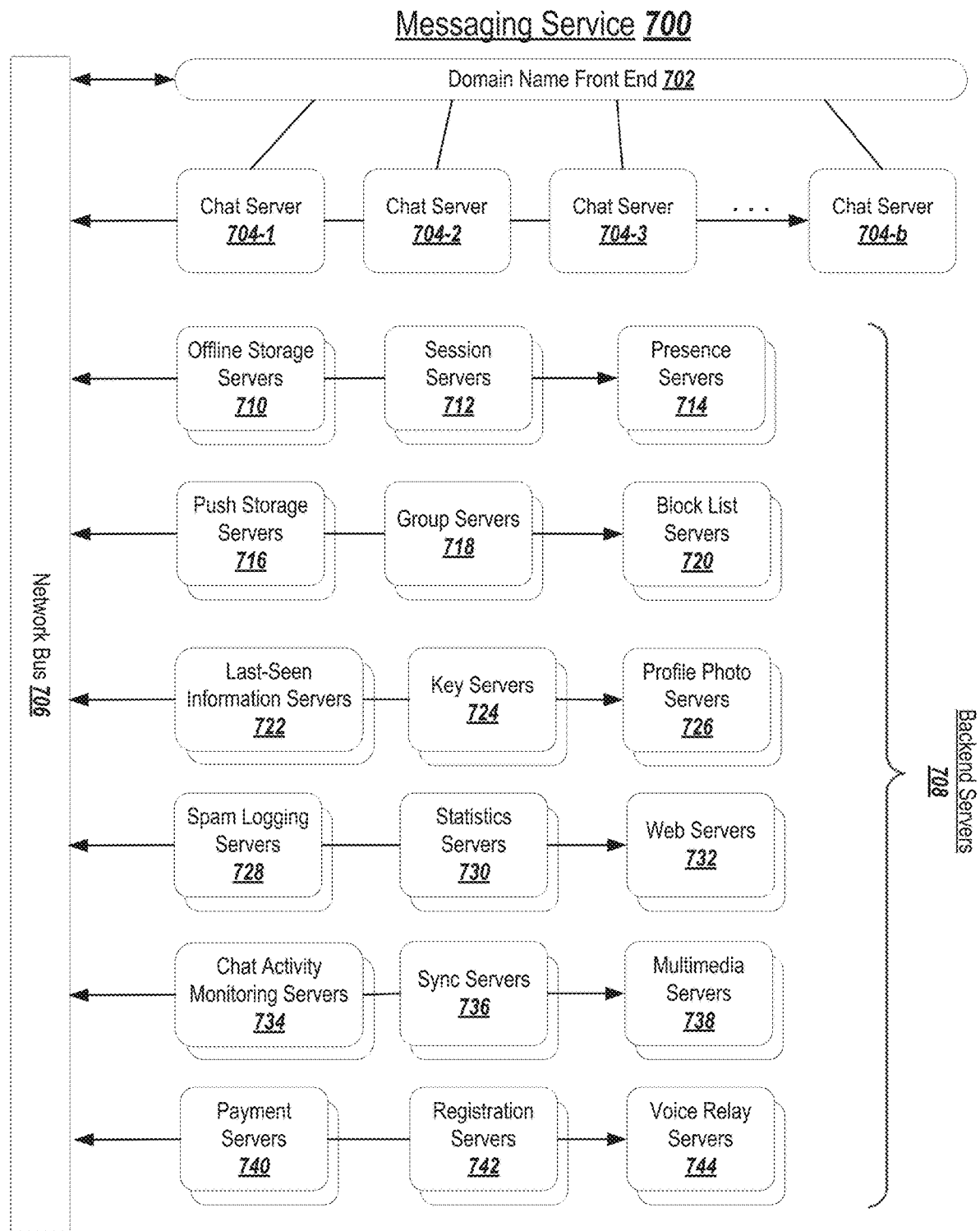
FIG. 7 depicts an exemplary messaging service system.

FIG. 7 illustrates an embodiment of a plurality of servers implementing various functions of a messaging service 700 suitable for use with exemplary embodiments. It will be appreciated that different distributions of work and functions may be used in various embodiments of a messaging service 700.

The messaging service 700 may comprise a domain name front end 702. The domain name front end 702 may be assigned one or more domain names associated with the messaging service 700 in a domain name system (DNS). The domain name front end 702 may receive incoming connections and distribute the connections to servers providing various messaging services.

The messaging service 702 may comprise one or more chat servers 704. The chat servers 704 may comprise front-end servers for receiving and transmitting user-to-user messaging updates such as chat messages. Incoming connections may be assigned to the chat servers 704 by the domain name front end 702 based on workload balancing.

The messaging service 700 may comprise backend servers 708. The backend servers 708 may perform specialized tasks in the support of the chat operations of the front-end chat servers 704. A plurality of different types of backend servers 708 may be used. It will be appreciated that the assignment of types of tasks to different backend serves 708 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 700 may comprise one or more offline storage servers 710. The one or more offline storage servers 710 may store messaging content for currently offline messaging clients in hold for when the messaging clients reconnect.

The messaging service 700 may comprise one or more sessions servers 712. The one or more session servers 712 may maintain session state of connected messaging clients.

The messaging service 700 may comprise one or more presence servers 714. The one or more presence servers 714 may maintain presence information for the messaging service 700. Presence information may correspond to user-specific information indicating whether or not a given user has an online messaging client and is available for chatting, has an online messaging client but is currently away from it, does not have an online messaging client, and any other presence state.

The messaging service 700 may comprise one or more push storage servers 716. The one or more push storage servers 716 may cache push requests and transmit the push requests to messaging clients. Push requests may be used to wake messaging clients, to notify messaging clients that a messaging update is available, and to otherwise perform server-side-driven interactions with messaging clients.

The messaging service 700 may comprise one or more group servers 718. The one or more group servers 718 may maintain lists of groups, add users to groups, remove users from groups, and perform the reception, caching, and forwarding of group chat messages.

The messaging service 700 may comprise one or more block list servers 720. The one or more block list servers 720 may maintain user-specific block lists, the user-specific incoming-block lists indicating for each user the one or more other users that are forbidden from transmitting messages to that user. Alternatively, or additionally, the one or more block list servers 720 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 700 may comprise one or more last seen information servers 722. The one or more last seen information servers 722 may receive, store, and maintain information indicating the last seen location, status, messaging client, and other elements of a user's last seen connection to the messaging service 700.

The messaging service 700 may comprise one or more key servers 724. The one or more key servers may host public keys for public/private key encrypted communication.

The messaging service 700 may comprise one or more profile photo servers 726. The one or more profile photo servers 726 may store and make available for retrieval profile photos for the plurality of users of the messaging service 700.

The messaging service 700 may comprise one or more spam logging servers 728. The one or more spam logging servers 728 may log known and suspected spam (e.g., unwanted messages, particularly those of a promotional nature). The one or more spam logging servers 728 may be operative to analyze messages to determine whether they are spam and to perform punitive measures, in some embodiments, against suspected spammers (users that send spam messages).

The messaging service 700 may comprise one or more statistics servers 730. The one or more statistics servers may compile and store statistics information related to the operation of the messaging service 700 and the behavior of the users of the messaging service 700.

The messaging service 700 may comprise one or more web servers 732. The one or more web servers 732 may engage in hypertext transport protocol (HTTP) and hypertext transport protocol secure (HTTPS) connections with web browsers.

The messaging service 700 may comprise one or more chat activity monitoring servers 734. The one or more chat activity monitoring servers 734 may monitor the chats of users to determine unauthorized or discouraged behavior by the users of the messaging service 700. The one or more chat activity monitoring servers 734 may work in cooperation with the spam logging servers 728 and block list servers 720, with the one or more chat activity monitoring servers 734 identifying spam or other discouraged behavior and providing spam information to the spam logging servers 728 and blocking information, where appropriate to the block list servers 720.

The messaging service 700 may comprise one or more sync servers 736. The one or more sync servers 736 may sync a messaging system (e.g., systems 100, 400) with contact information from a messaging client, such as an address book on a mobile phone, to determine contacts for a user in the messaging service 700.

The messaging service 700 may comprise one or more multimedia servers 738. The one or more multimedia servers may store multimedia (e.g., images, video, audio) in transit between messaging clients, multimedia cached for offline endpoints, and may perform transcoding of multimedia.

The messaging service 700 may comprise one or more payment servers 740. The one or more payment servers 740 may process payments from users. The one or more payment servers 740 may connect to external third-party servers for the performance of payments.

The messaging service 700 may comprise one or more registration servers 742. The one or more registration servers 742 may register new users of the messaging service 700.

The messaging service 700 may comprise one or more voice relay servers 744. The one or more voice relay servers 744 may relay voice-over-internet-protocol (VoIP) voice communication between messaging clients for the performance of VoIP calls.

Figure 8:
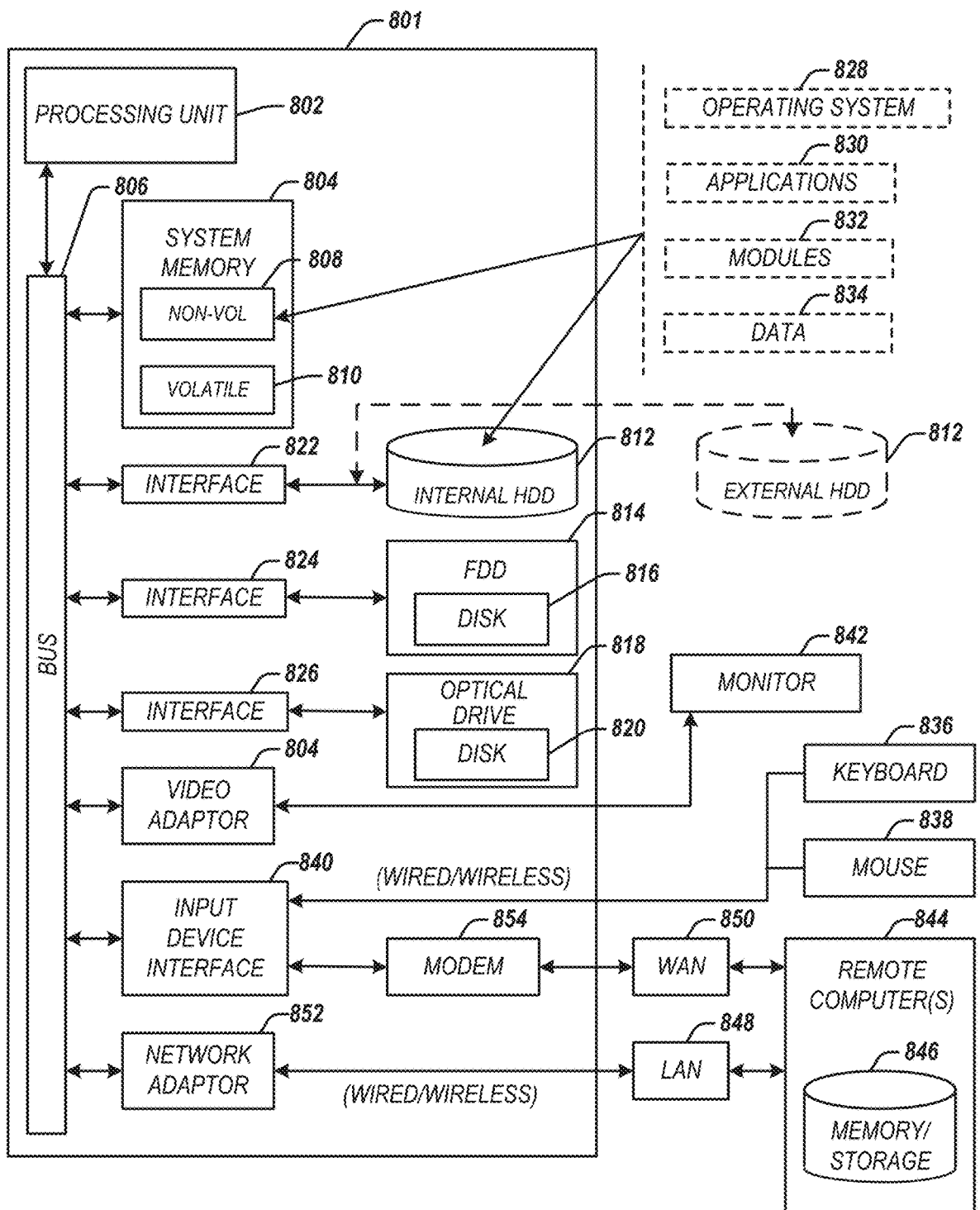
FIG. 8 depicts an exemplary computing architecture.

The above-described examples, features, methods may be embodied as instructions on a computer readable medium or as part of a computing architecture. FIG. 8 illustrates an embodiment of an exemplary computing architecture 800 suitable for implementing various embodiments as previously described. In one embodiment, the computing architecture 800 may comprise or be implemented as part of an electronic device, such as a computer 801. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 802, a system memory 804 and a system bus 806. The processing unit 802 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 802.

The system bus 806 provides an interface for system components including, but not limited to, the system memory 804 to the processing unit 802. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile memory 808 and/or volatile memory 810. A basic input/output system (BIOS) can be stored in the non-volatile memory 808.

The computing architecture 800 may include various types of computer-readable storage media in the form of one or more lower speed memory units, including an internal (or external) hard disk drive (HDD) 812, a magnetic floppy disk drive (FDD) 814 to read from or write to a removable magnetic disk 816, and an optical disk drive 818 to read from or write to a removable optical disk 820 (e.g., a CD-ROM or DVD). The HDD 812, FDD 814 and optical disk drive 820 can be connected to the system bus 806 by an HDD interface 822, an FDD interface 824 and an optical drive interface 826, respectively. The HDD interface 822 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 808, 812, including an operating system 828, one or more application programs 830, other program modules 832, and program data 834. In one embodiment, the one or more application programs 830, other program modules 832, and program data 834 can include, for example, the various applications and/or components of the messaging systems 100 or 400.

A user can enter commands and information into the computer 801 through one or more wire/wireless input devices, for example, a keyboard 836 and a pointing device, such as a mouse 838. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 802 through an input device interface 840 that is coupled to the system bus 806, but can be connected by other interfaces such as a parallel port, IEEE 694 serial port, a game port, a USB port, an IR interface, and so forth.

A monitor 842 or other type of display device is also connected to the system bus 806 via an interface, such as a video adaptor 844. The monitor 842 may be internal or external to the computer 801. In addition to the monitor 842, a computer typically includes other peripheral output devices, such as speakers, printers, and so forth.

The computer 801 may operate in a networked environment using logical connections via wire and/or wireless communications to one or more remote computers, such as a remote computer 844. The remote computer 844 can be a workstation, a server computer, a router, a personal computer, portable computer, microprocessor-based entertainment appliance, a peer device or other common network node, and typically includes many or all of the elements described relative to the computer 801, although, for purposes of brevity, only a memory/storage device 846 is illustrated. The logical connections depicted include wire/wireless connectivity to a local area network (LAN) 848 and/or larger networks, for example, a wide area network (WAN) 850. Such LAN and WAN networking environments are commonplace in offices and companies, and facilitate enterprise-wide computer networks, such as intranets, all of which may connect to a global communications network, for example, the Internet.

When used in a LAN networking environment, the computer 801 is connected to the LAN 848 through a wire and/or wireless communication network interface or adaptor 852. The adaptor 852 can facilitate wire and/or wireless communications to the LAN 848, which may also include a wireless access point disposed thereon for communicating with the wireless functionality of the adaptor 852.

When used in a WAN networking environment, the computer 801 can include a modem 854, or is connected to a communications server on the WAN 850, or has other means for establishing communications over the WAN 850, such as by way of the Internet. The modem 854, which can be internal or external and a wire and/or wireless device, connects to the system bus 806 via the input device interface 840. In a networked environment, program modules depicted relative to the computer 801, or portions thereof, can be stored in the remote memory/storage device 846. It will be appreciated that the network connections shown are exemplary and other means of establishing a communications link between the computers can be used.

The computer 801 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
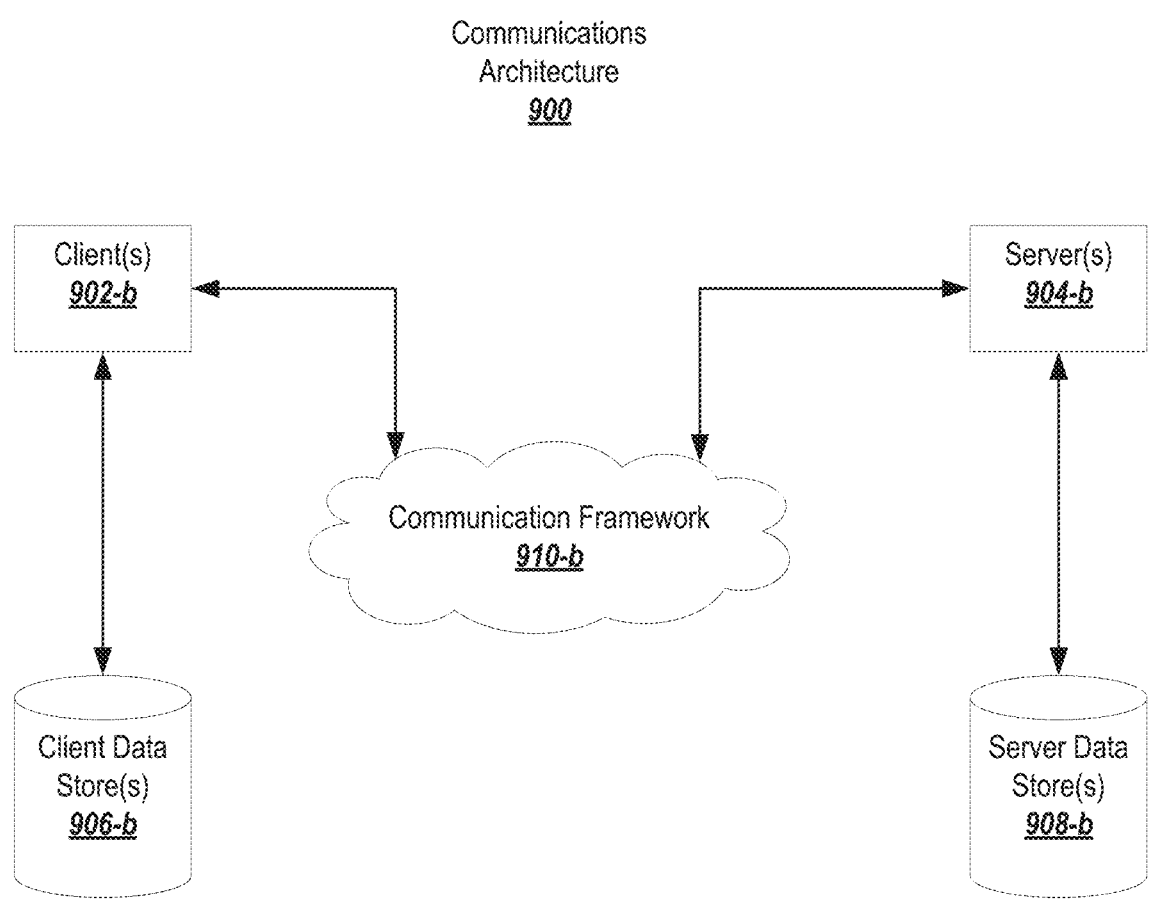
FIG. 9 depicts an exemplary communication architecture.

FIG. 9 is a block diagram depicting an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 includes one or more clients 902 and servers 904. The clients 902 and the servers 904 are operatively connected to one or more respective client data stores 906 and server data stores 908 that can be employed to store information local to the respective clients 902 and servers 904, such as cookies and/or associated contextual information.

The clients 902 and the servers 904 may communicate information between each other using a communication framework 910. The communications framework 910 may implement any well-known communications techniques and protocols. The communications framework 910 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 910 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
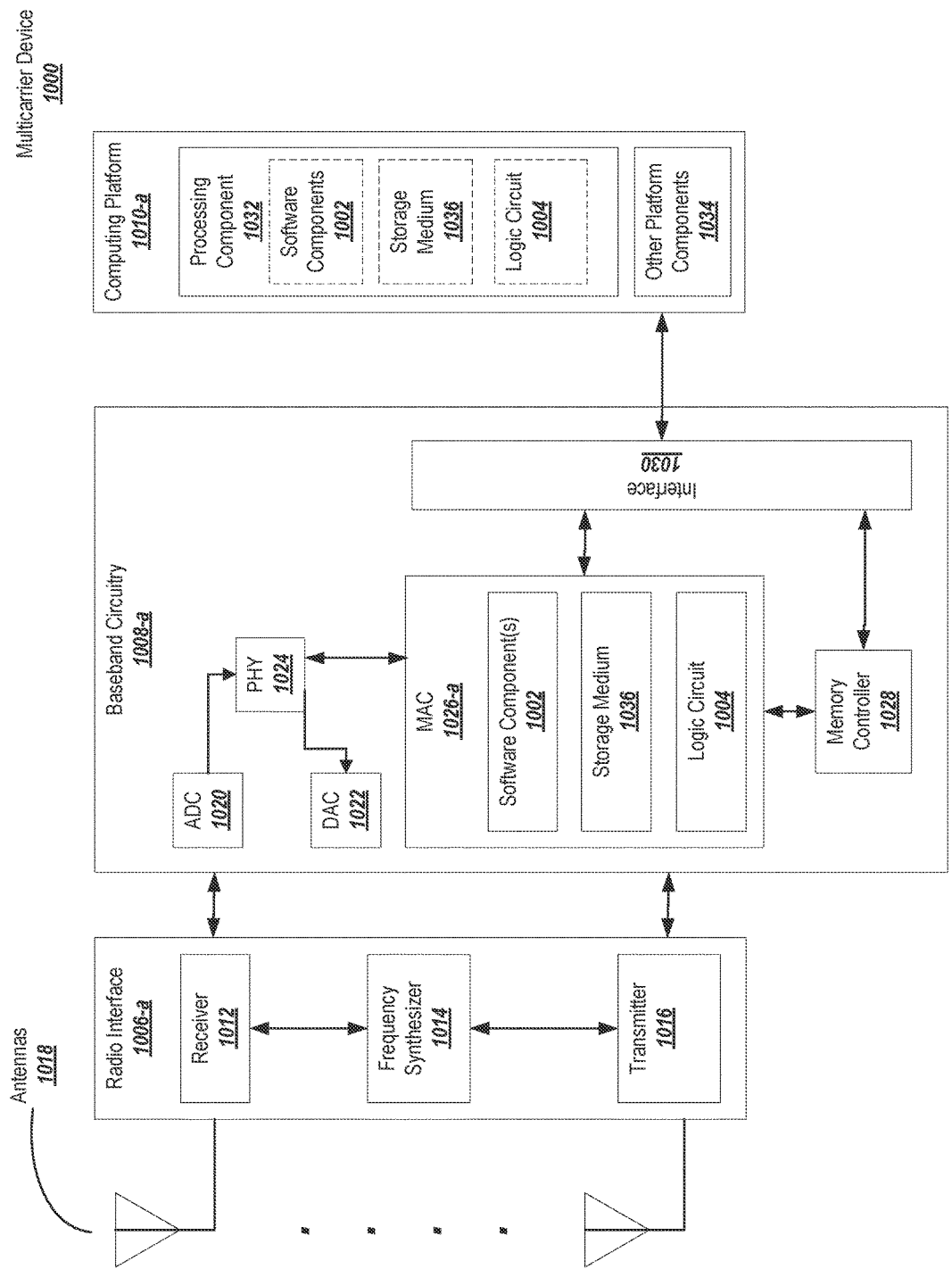
FIG. 10 depicts an exemplary multicarrier communications device.

FIG. 10 illustrates an embodiment of a device 1000 for use in a multicarrier OFDM system, such as the messaging systems 100 or 400. The device 1000 may implement, for example, software components 1002 as described with reference to the messaging logic or any related logic for sending or receiving end-to-end encrypted interactive messages. The device 1000 may also implement a logic circuit 1004. The logic circuit 1004 may include physical circuits to perform operations described for the messaging systems 100 or 400. As shown in FIG. 10, device 1000 may include a radio interface 1006, baseband circuitry 1008, and a computing platform 1010, although embodiments are not limited to this configuration.

The device 1000 may implement some or all of the structure and/or operations for the messaging systems 100 or 400 and/or logic circuit 1004 in a single computing entity, such as entirely within a single device. Alternatively, the device 1000 may distribute portions of the structure and/or operations for the messaging systems 100 or 400 and/or logic circuit 1004 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1006 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1006 may include, for example, a receiver 1012, a transmitter 1014 and/or a frequency synthesizer 1016. The radio interface 1006 may include bias controls, a crystal oscillator and/or one or more antennas 1018. In another embodiment, the radio interface 1006 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1008 may communicate with the radio interface 1006 to process receive and/or transmit signals and may include, for example, an analog-to-digital converter 1020 for down converting received signals, and a digital-to-analog converter 1022 for up-converting signals for transmission. Further, the baseband circuitry 1008 may include a baseband or physical layer (PHY) processing circuit 1024 for PHY link layer processing of respective receive/transmit signals. The baseband circuitry 1008 may include, for example, a processing circuit 1026 for medium access control (MAC)/data link layer processing. The baseband circuitry 1008 may include a memory controller 1028 for communicating with the processing circuit 1026 and/or a computing platform 1010, for example, via one or more interfaces 1030.

In some embodiments, the PHY processing circuit 1024 may include a frame construction and/or detection module, in combination with additional circuitry such as a buffer memory, to construct and/or deconstruct communication frames, such as radio frames. Alternatively, or in addition, the MAC processing circuit 1026 may share processing for certain of these functions or perform these processes independent of the PHY processing circuit 1024. In some embodiments, MAC and PHY processing may be integrated into a single circuit.

The computing platform 1010 may provide computing functionality for the device 1000. As shown, the computing platform 1010 may include a processing component 1032. In addition to, or alternatively of, the baseband circuitry 1008, the device 1000 may execute processing operations or logic for the messaging systems 100 or 400 and logic circuit 1004 using the processing component 1032. The processing component 1032 (and/or the PHY 1024 and/or MAC 1026) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1010 may further include other platform components 1034. Other platform components 1034 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1000 described herein, may be included or omitted in various embodiments of the device 1000, as suitably desired. In some embodiments, the device 1000 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of the device 1000 may be implemented using any combination of discrete circuitry, application specific integrated circuits (ASICs), logic gates and/or single chip architectures. Further, the features of the device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1000 shown in the block diagram of FIG. 10 may represent one functionally descriptive example of many potential implementations. Accordingly, division, omission or inclusion of block functions depicted in the accompanying Figures does not infer that the hardware components, circuits, software and/or elements for implementing these functions would be necessarily be divided, omitted, or included in embodiments.

At least one computer-readable storage medium 1036 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more exemplary embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
   determining whether a pack is available by checking local memory or cache to determine if the pack has been downloaded or retrieved from one or more remote computing devices, the pack including at least a plurality of approved message templates and corresponding message template identifiers;
   in response to the pack not being in the local memory or the cache, calling the one or more remote computing devices to retrieve the pack;
   obtaining a message template identifier and a message template associated with the message template identifier in the pack, the message template containing static and dynamic portions;
   validating that the dynamic portions of the message template match or correspond to one or more dynamic parameters to be sent to a client device;
   encrypting at least the one or more dynamic parameters and the message template identifier as an encrypted message; and
   sending the encrypted message to the client device.

2. The method of claim 1, wherein the encrypted message is sent end-to-end encrypted to the client device.

3. The method of claim 1, further comprising:
   performing an application programming interface (API) call to a client application, the API call indicating intent to send the message template identifier and the one or more dynamic parameters to the client device.

4. The method of claim 1, wherein the message template comprises:
   a header, a footer, message content, media, and/or one or more action elements, and
   wherein the one or more action elements comprises a call button, a visit website button, and/or a quick reply button.

5. The method of claim 1, wherein the one or more dynamic parameters comprises recipient-specific information,
   wherein the encrypted message content is decrypted at the client device and the dynamic portions of the message template are filled in with the recipient-specific information derived from the decrypted message, and
   wherein the client device renders and displays the message template as an interactive message.

6. The method of claim 5, wherein the recipient-specific information is sensitive or private information comprising: (i) a legal name of a user associated with a second client device, (ii) an address of the user, (iii) medical information associated with the user, and/or (iv) any personally identifiable information associated with the user.

7. At least one non-transitory computer-readable storage medium comprising instructions that, when executed, cause at least one processor to:
   determine whether a pack is available by checking local memory or cache to determine if the pack has been downloaded or retrieved from one or more remote computing devices, the pack including at least a plurality of approved message templates and corresponding message template identifiers;

in response to the pack not being in the local memory or the cache, call the one or more remote computing devices to retrieve the pack;

obtain a message template identifier and a message template associated with the message template identifier in the pack, the message template containing static and dynamic portions;

validate that the dynamic portions of the message template match or correspond to one or more dynamic parameters to be sent to a client device;

encrypt at least the one or more dynamic parameters and the message template identifier as an encrypted message; and send the encrypted message to the client device.

8. The medium of claim 7, wherein the encrypted message is sent end-to-end encrypted to the client device.

9. The medium of claim 7, wherein the instructions further cause the at least one processor to:

perform an application programming interface (API) call to a client application, the API call indicating intent to send the message template identifier and the one or more dynamic parameters to the client device.

10. The medium of claim 7, wherein the message template comprises:

a header, a footer, message content, media, and/or one or more action elements, and wherein the one or more action elements comprises a call button, a visit website button, and/or a quick reply button.

11. The medium of claim 7, wherein the one or more dynamic parameters comprises recipient-specific information, wherein the encrypted message content is decrypted at the client device and the dynamic portions of the message template are filled in with the recipient-specific information derived from the decrypted message, and wherein the client device renders and displays the message template as an interactive message.

12. The medium of claim 11, wherein the recipient-specific information is sensitive or private information comprising: (i) a legal name of a user associated with a second client device, (ii) an address of the user, (iii) medical information associated with the user, and/or (iv) any personally identifiable information associated with the user.

13. An apparatus comprising:
memory; and
at least one processor operable to execute stored instructions that, when executed, causes the at least one processor to:
determine whether a pack is available by checking local memory or cache to determine if the pack has been downloaded or retrieved from one or more remote computing devices, the pack including at least a plurality of approved message templates and corresponding message template identifiers;
in response to the pack not being in the local memory or the cache, call the one or more remote computing devices to retrieve the pack;
obtain a message template identifier and a message template associated with the message template identifier in the pack, the message template containing static and dynamic portions;
validate that the dynamic portions of the message template match or correspond to one or more dynamic parameters to be sent to a client device;
encrypt at least the one or more dynamic parameters and the message template identifier as an encrypted message; and
send the encrypted message to the client device.

14. The apparatus of claim 13, wherein the encrypted message is sent end-to-end encrypted to the client device.

15. The apparatus of claim 13, wherein the at least one processor is further caused to:
perform an application programming interface (API) call to a client application, the API call indicating intent to send the message template identifier and the one or more dynamic parameters to the client device.

16. The apparatus of claim 13, wherein the message template comprises:
a header, a footer, message content, media, and/or one or more action elements, and
wherein the one or more action elements comprises a call button, a visit website button, and/or a quick reply button.

17. The apparatus of claim 13, wherein the one or more dynamic parameters comprises recipient-specific information,
wherein the encrypted message content is decrypted at the client device and the dynamic portions of the message template are filled in with the recipient-specific information derived from the decrypted message, and
wherein the client device renders and displays the message template as an interactive message.

\* \* \* \* \*